US008132997B2

(12) United States Patent
Reuille et al.

(10) Patent No.: US 8,132,997 B2
(45) Date of Patent: Mar. 13, 2012

(54) LIFT APPARATUS MOUNTABLE ON A VEHICLE

(75) Inventors: Bennett J. Reuille, Fort Wayne, IN (US); Thomas C. Wetmore, Fort Wayne, IN (US)

(73) Assignee: Razor Products, Inc., Fort Wayne, IN (US)

( * ) Notice: Subject to any disclaimer, the term of this patent is extended or adjusted under 35 U.S.C. 154(b) by 229 days.

(21) Appl. No.: 12/069,849

(22) Filed: Feb. 13, 2008

(65) Prior Publication Data

US 2008/0206030 A1    Aug. 28, 2008

Related U.S. Application Data

(60) Provisional application No. 60/901,515, filed on Feb. 14, 2007.

(51) Int. Cl.
*B60P 9/00* (2006.01)
*B65F 1/00* (2006.01)
*B60R 9/00* (2006.01)

(52) U.S. Cl. ......................... 414/462; 414/545; 224/537

(58) Field of Classification Search ............... 116/28 R; 187/236, 270; 224/497, 508, 510, 519, 524, 224/526, 528, 537; 254/311, 358, 362, 95; 362/485, 531–532, 541, 549; 414/462, 495, 414/540, 545, 921
See application file for complete search history.

(56) References Cited

U.S. PATENT DOCUMENTS

| | | | |
|---|---|---|---|
| 2,277,529 A * | 3/1942 | Richter | 414/545 |
| 2,949,197 A * | 8/1960 | Lomen et al. | 414/545 |
| 3,246,777 A * | 4/1966 | Tabordon | 414/545 |
| 3,432,052 A * | 3/1969 | Debusk | 414/486 |
| 3,559,827 A * | 2/1971 | Schier | 414/563 |
| 3,691,366 A * | 9/1972 | Spreuer | 362/253 |
| 3,931,903 A | 1/1976 | Johnson | |
| 4,234,284 A | 11/1980 | Hauff | |
| 4,286,309 A * | 8/1981 | Rasinski | 362/549 |
| 4,588,048 A * | 5/1986 | Rodriguez | 187/213 |
| 4,640,658 A | 2/1987 | Webb, Jr. | |
| 4,695,218 A | 9/1987 | Boyer | |
| 4,705,448 A | 11/1987 | Mungons | |
| 4,741,660 A | 5/1988 | Kent | |
| 4,775,282 A | 10/1988 | Van Vliet | |
| 4,934,894 A | 6/1990 | White | |
| 5,011,361 A | 4/1991 | Peterson | |
| 5,018,651 A | 5/1991 | Hull et al. | |
| 5,122,024 A | 6/1992 | Stokes | |
| 5,137,411 A | 8/1992 | Eul et al. | |
| 5,234,311 A * | 8/1993 | Loduha et al. | 414/546 |

(Continued)

*Primary Examiner* — Gregory Adams
(74) *Attorney, Agent, or Firm* — Bose McKinney & Evans LLP

(57) ABSTRACT

An apparatus mountable on a vehicle and having a mounting section and a lift section. The lift section is moveably coupled to the mounting section. A drive chain having a plurality of articulating links and defining opposite first and second ends is operably coupled with a drive gear. At least one of the drive gear and the first and second ends of the drive chain is coupled to the mounting section and at least another one of these items is coupled to the lift section. The rotation of the drive gear movingly drives the chain and thereby moves the lift section relative to the mounting section. In some embodiments, the ends of the drive chain are coupled to one of the mounting section and the lift section and the drive gear is mounted on the other one of the mounting section and the lift section.

29 Claims, 24 Drawing Sheets

U.S. PATENT DOCUMENTS

| | | |
|---|---|---|
| 5,366,338 A | 11/1994 | Mortensen |
| 5,427,289 A | 6/1995 | Ostor |
| 5,431,522 A | 7/1995 | Ross |
| 5,456,564 A | 10/1995 | Bianchini |
| 5,462,398 A | 10/1995 | Hymer |
| 5,482,424 A | 1/1996 | Jones et al. |
| 5,513,943 A * | 5/1996 | Lugash et al. ................. 414/545 |
| 5,567,107 A | 10/1996 | Bruno et al. |
| 5,676,292 A * | 10/1997 | Miller ........................... 224/524 |
| 5,816,763 A | 10/1998 | Hamann et al. |
| 5,984,613 A | 11/1999 | Motilewa |
| 6,059,527 A * | 5/2000 | Ranken et al. ................. 414/545 |
| 6,086,314 A * | 7/2000 | Savaria ......................... 414/546 |
| 6,099,231 A | 8/2000 | Levi |
| 6,105,843 A | 8/2000 | Dollesin |
| 6,164,895 A | 12/2000 | Croswell |
| 6,193,124 B1 | 2/2001 | Brazil et al. |
| 6,237,824 B1 | 5/2001 | Bagley |
| 6,361,264 B1 | 3/2002 | Guthrie et al. |
| 6,364,597 B2 | 4/2002 | Klinkenberg |
| 6,386,817 B1 | 5/2002 | Cash |
| 6,513,690 B1 * | 2/2003 | Churchill et al. ............. 224/498 |
| 6,524,054 B2 | 2/2003 | Maney |
| 6,579,055 B1 | 6/2003 | Williams |
| 6,595,398 B2 | 7/2003 | Himel, Jr. |
| 6,655,895 B1 | 12/2003 | Dahl |
| 6,685,421 B1 | 2/2004 | Reeves |
| 6,692,215 B1 | 2/2004 | Panzarella et al. |
| 6,698,995 B1 | 3/2004 | Bik et al. |
| 6,729,827 B1 | 5/2004 | Williams et al. |
| 6,783,315 B1 | 8/2004 | Senechal |
| 6,786,693 B1 | 9/2004 | Neale |
| 6,799,873 B2 * | 10/2004 | Fox ............................... 362/485 |
| 6,830,423 B1 | 12/2004 | Williams et al. |
| 6,884,018 B1 | 4/2005 | Dugan et al. |
| 6,887,027 B2 | 5/2005 | O'Leary et al. |
| 7,101,142 B2 | 9/2006 | Bik et al. |
| 7,278,815 B2 | 10/2007 | Pedrini |
| 2001/0014272 A1 | 8/2001 | Ochoa et al. |
| 2003/0057244 A1 * | 3/2003 | Dorety ......................... 224/519 |
| 2003/0152449 A1 | 8/2003 | Marich et al. |
| 2003/0156930 A1 | 8/2003 | Ahedo, Jr. |
| 2003/0165376 A1 | 9/2003 | Bruno et al. |
| 2004/0191037 A1 | 9/2004 | Potts |
| 2004/0213655 A1 | 10/2004 | Buckner et al. |
| 2005/0129490 A1 | 6/2005 | Hutchins |
| 2006/0263182 A1 * | 11/2006 | Mizner ......................... 414/462 |

* cited by examiner

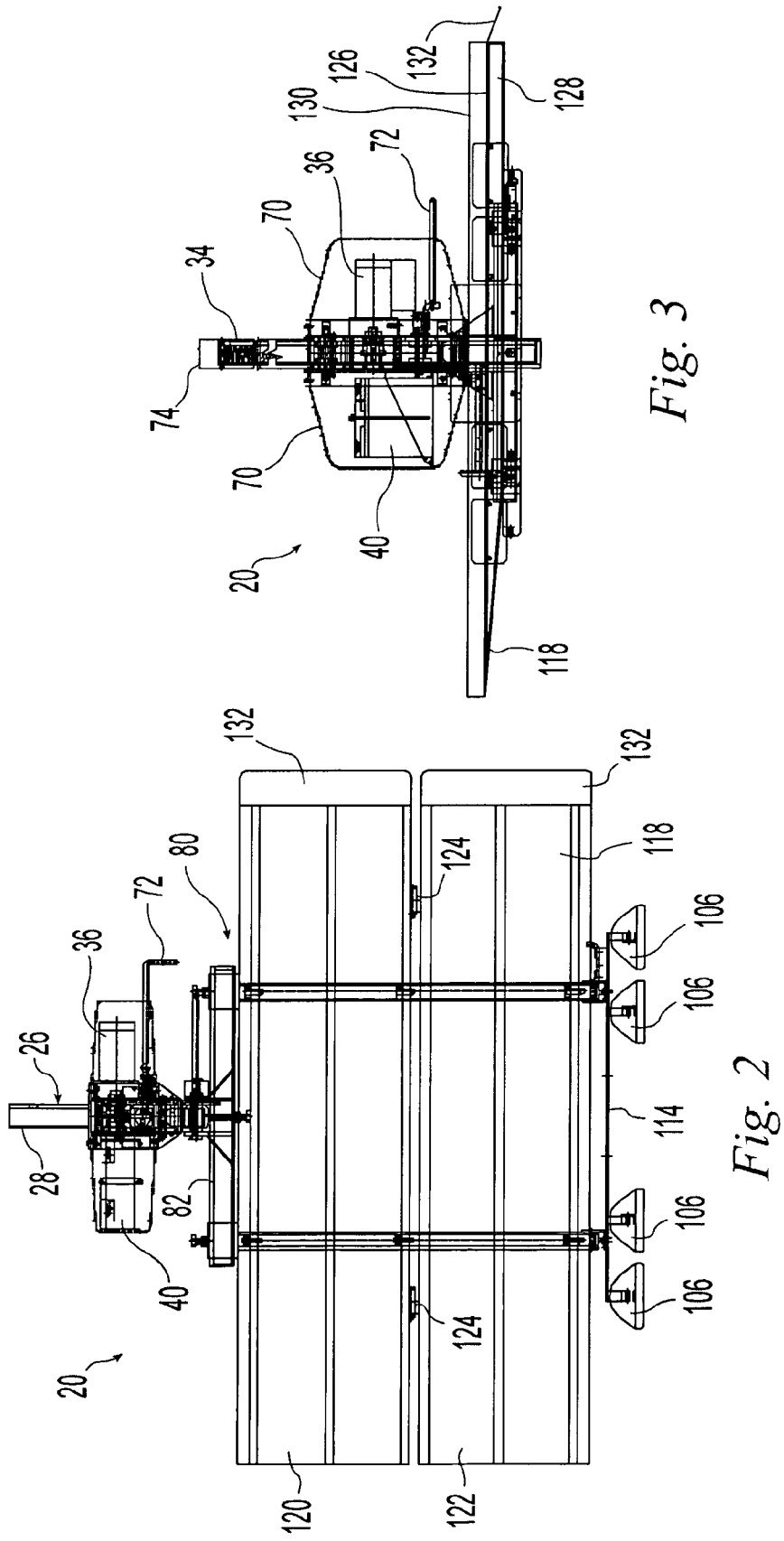

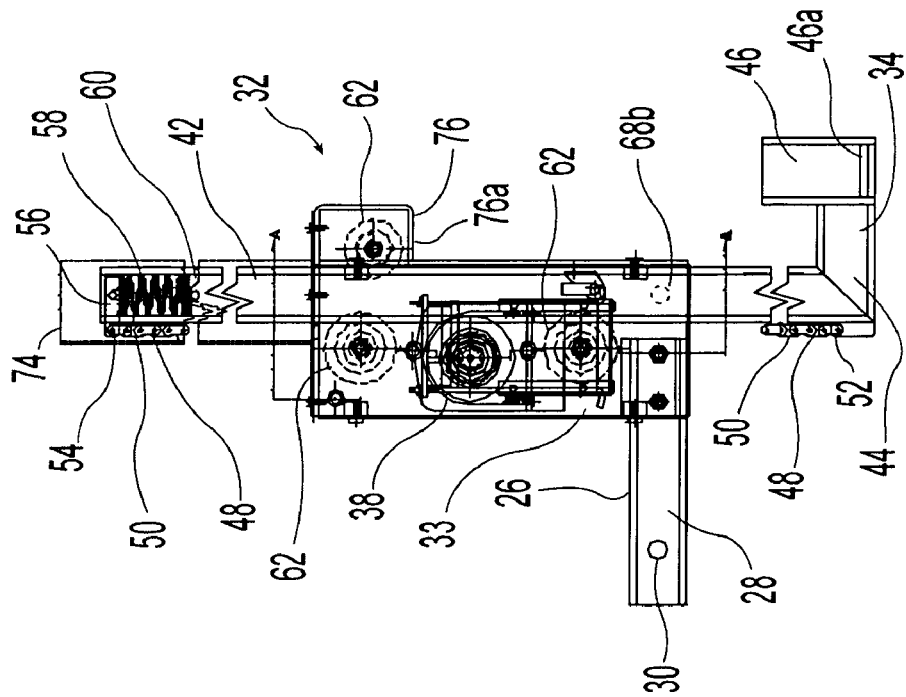
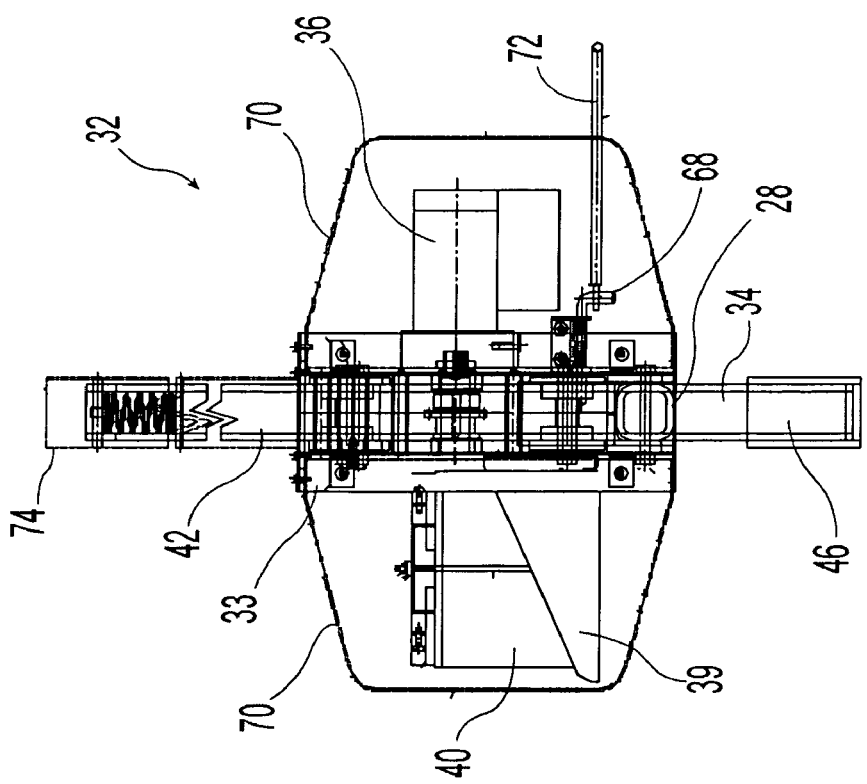
Fig. 5
Fig. 4

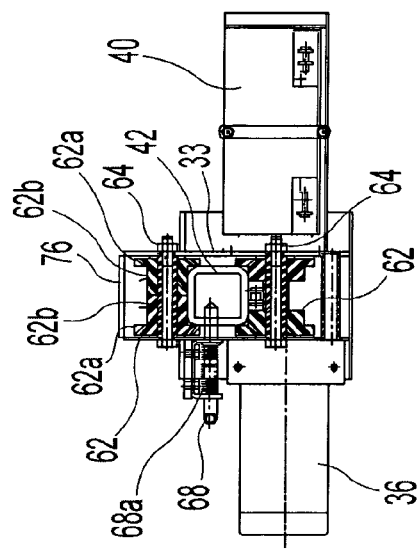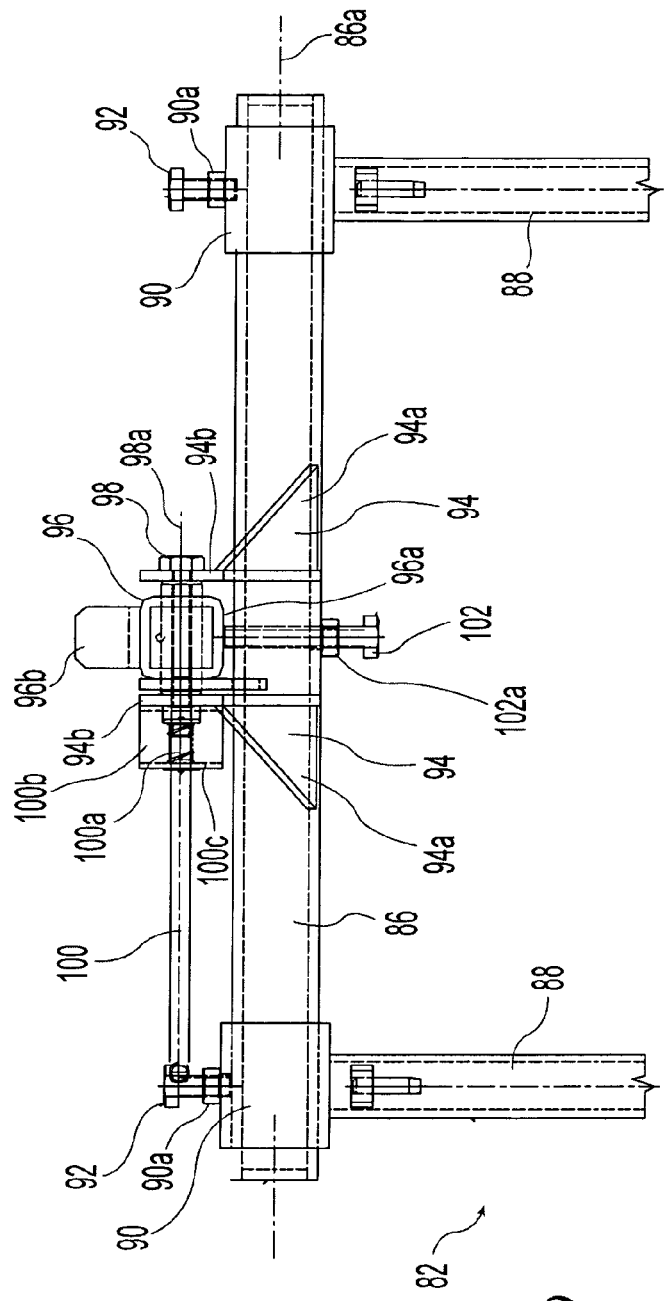

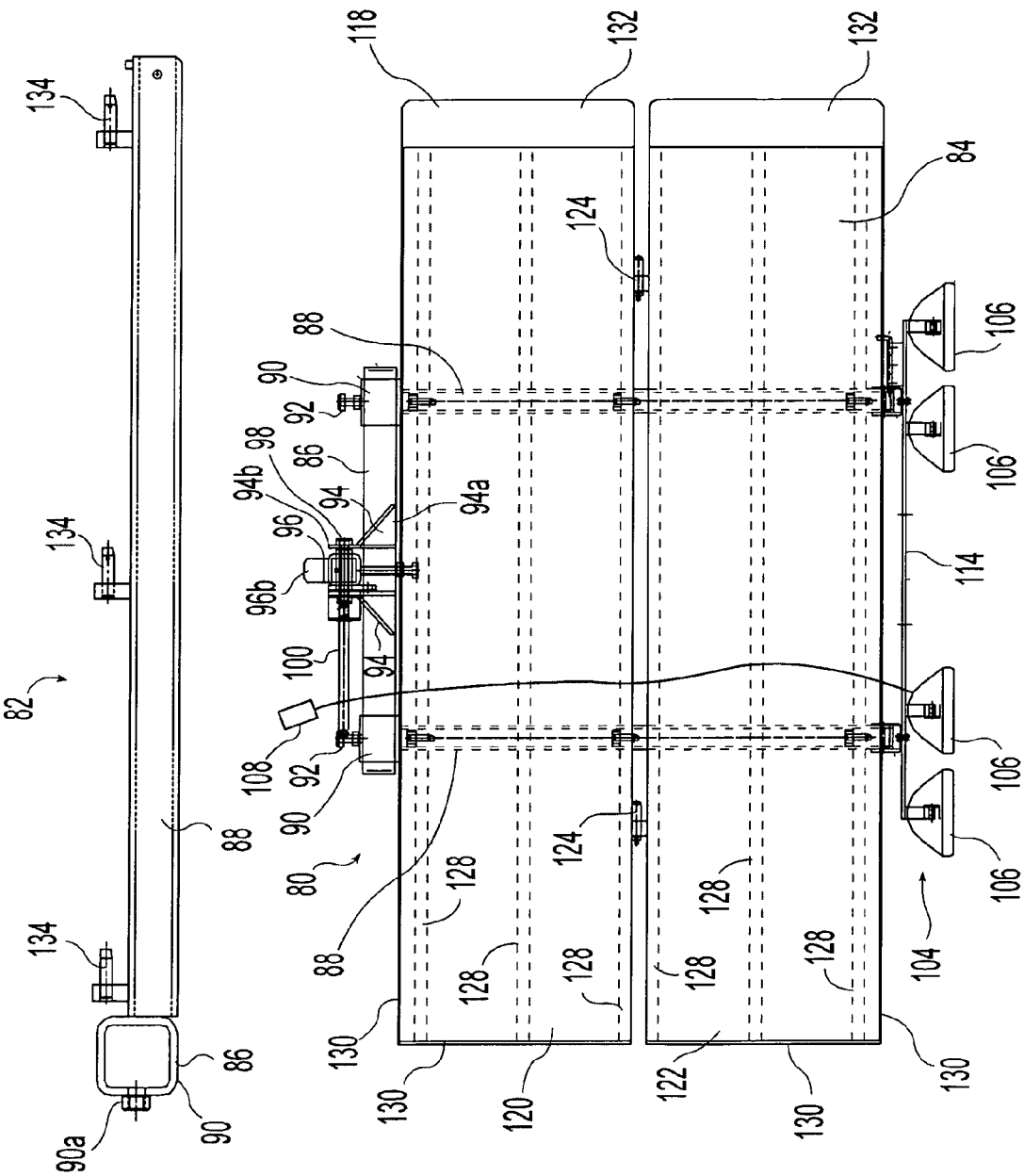

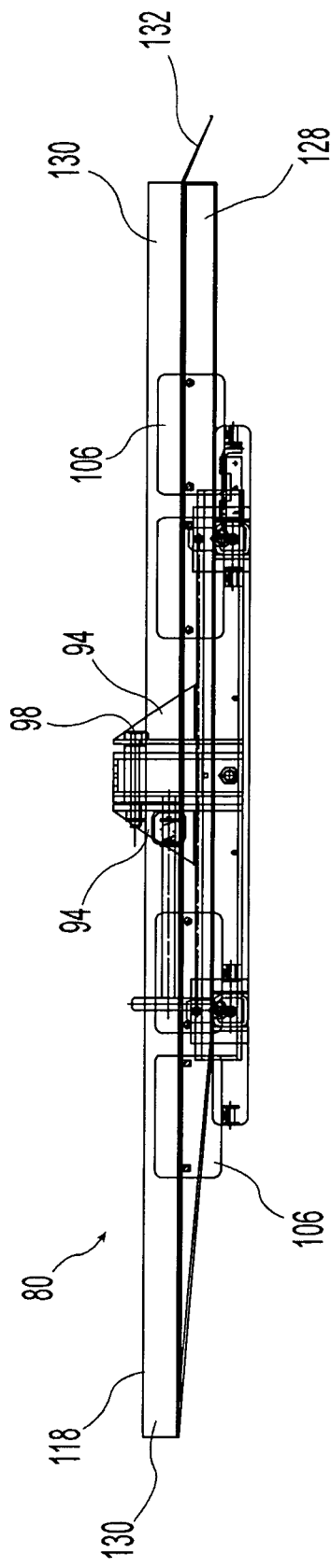
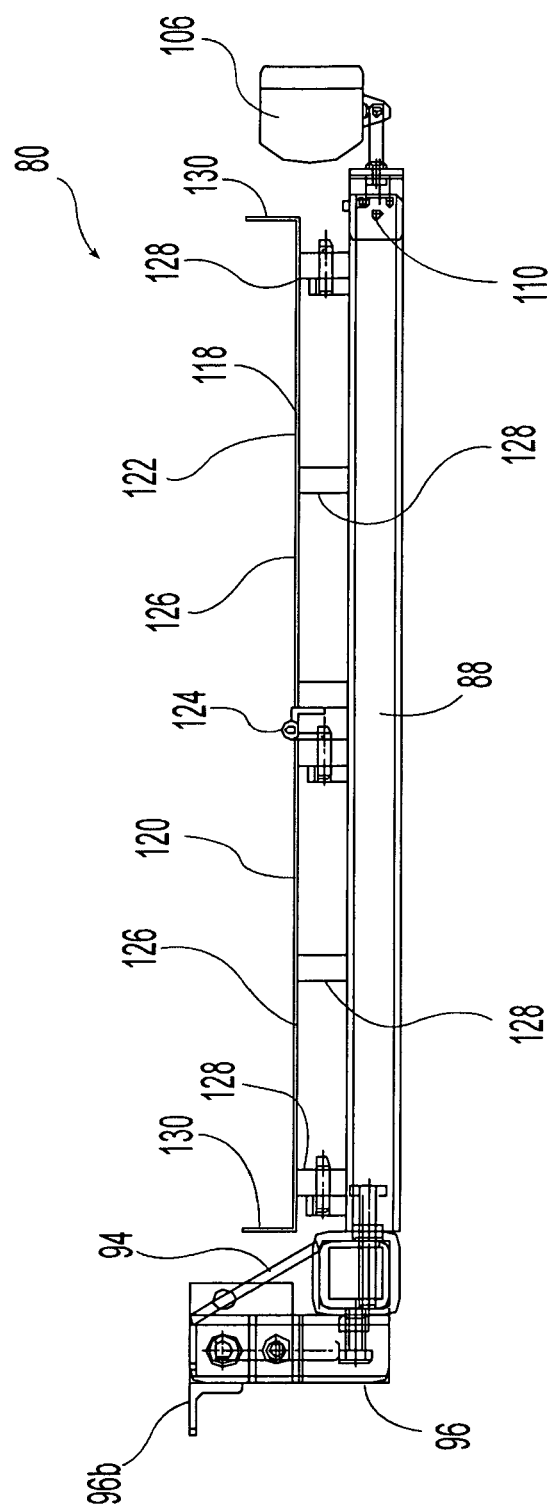
Fig. 12
Fig. 13

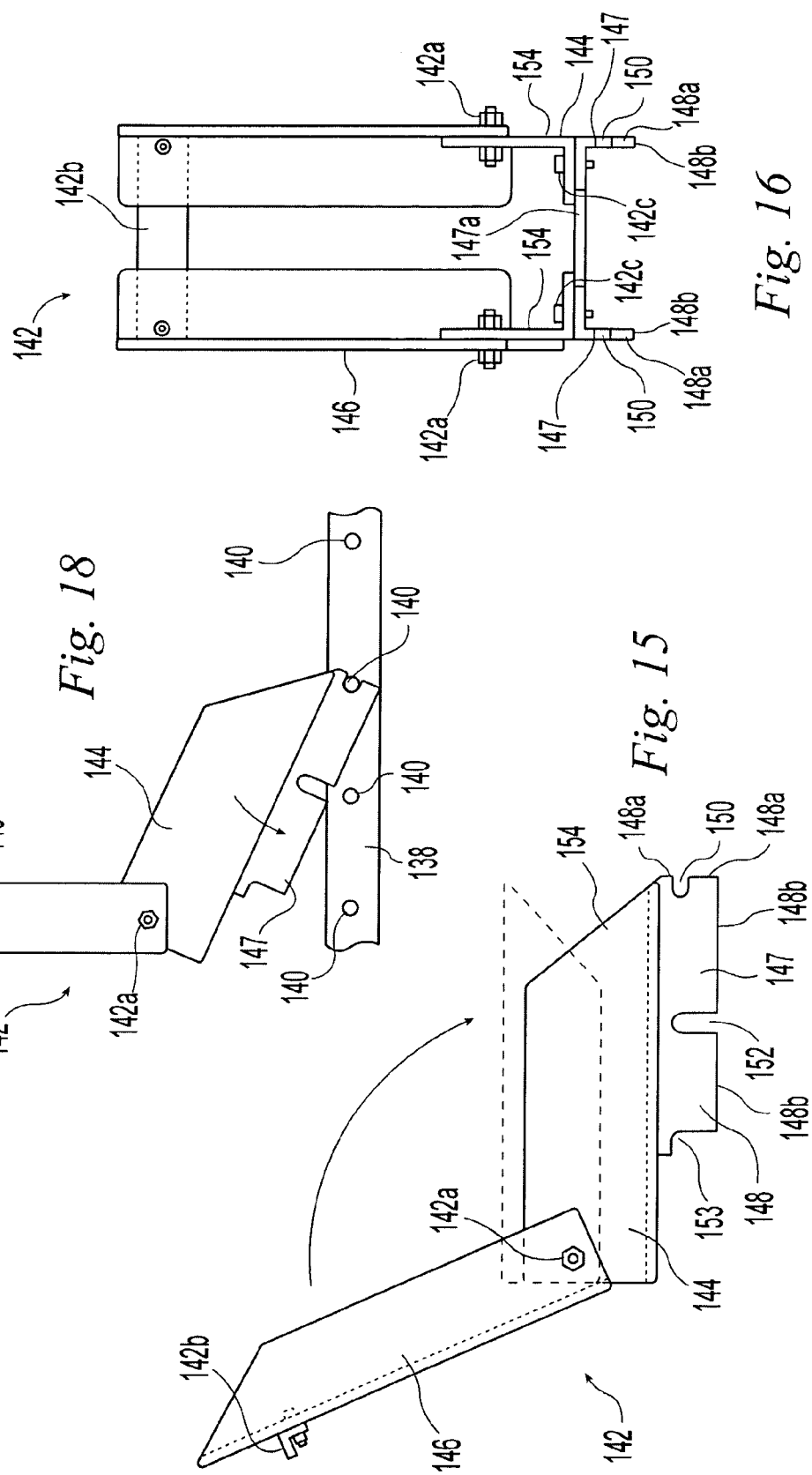

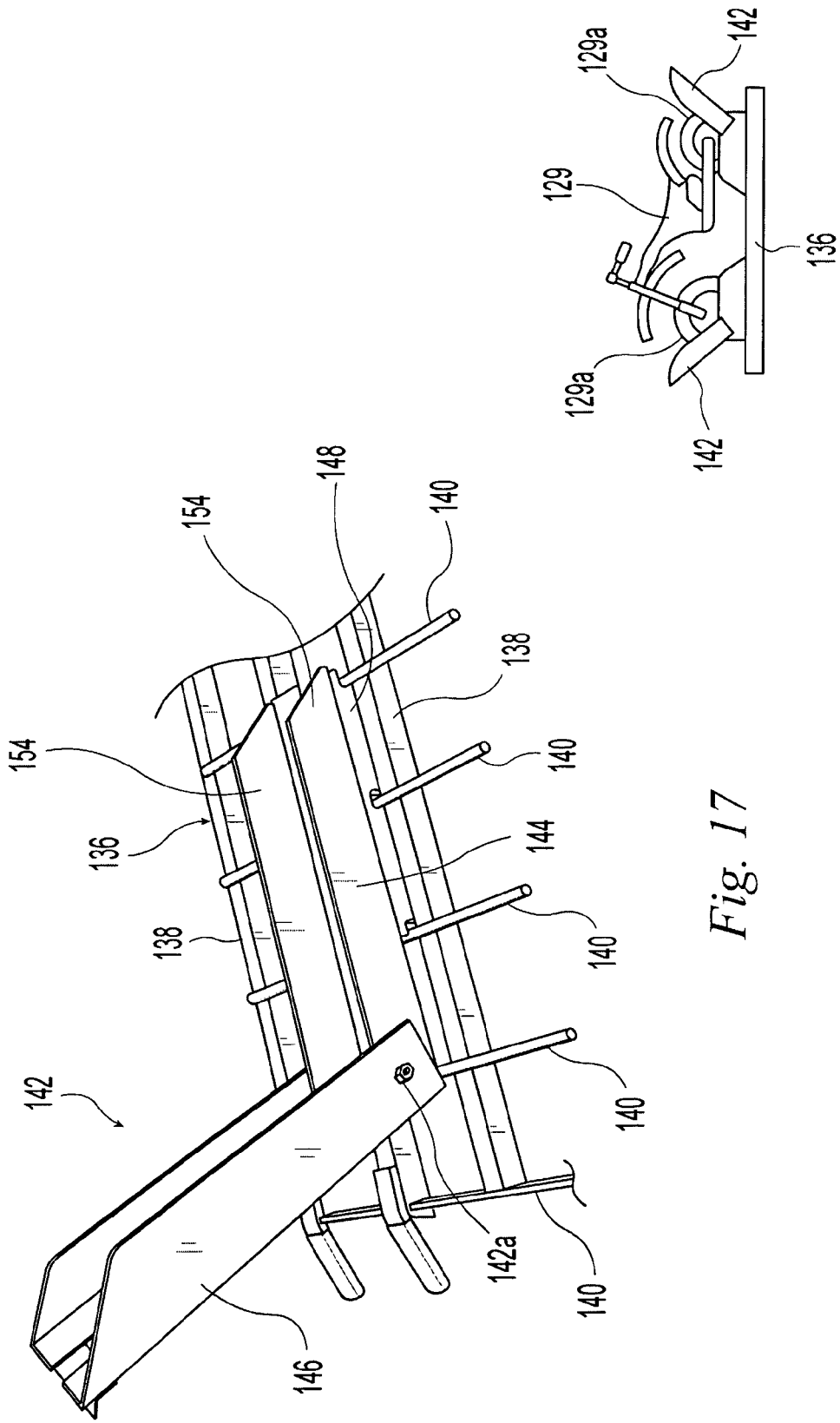

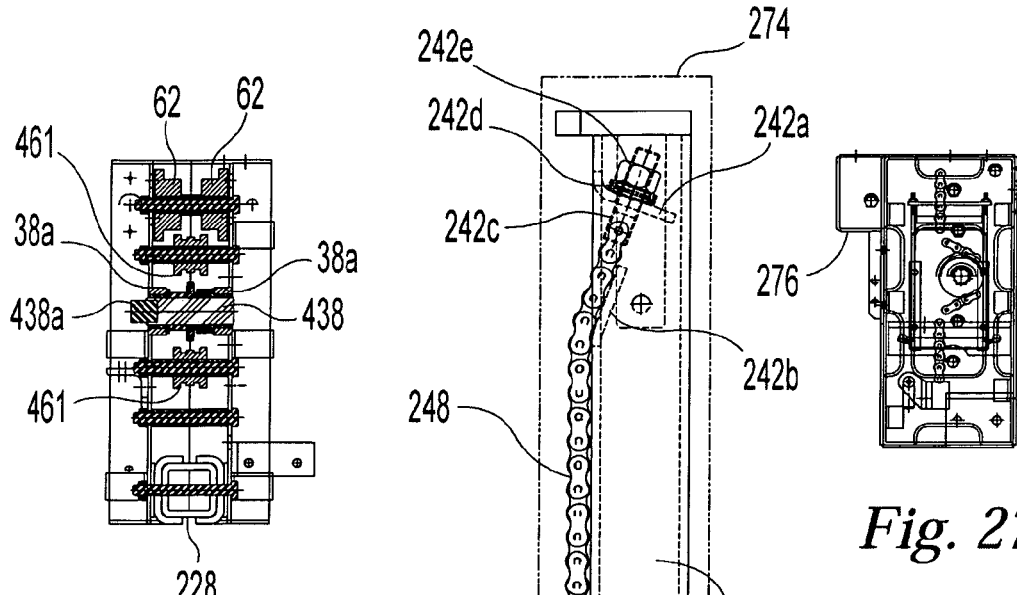
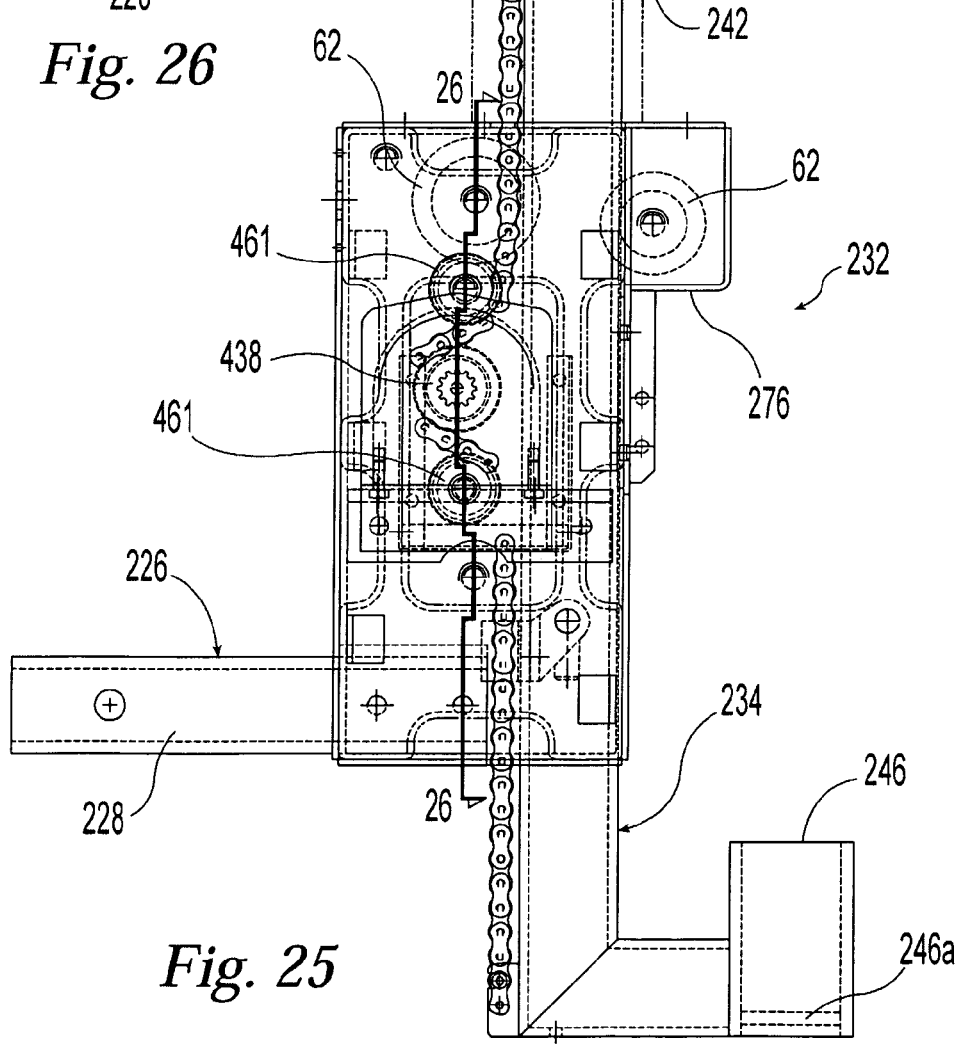

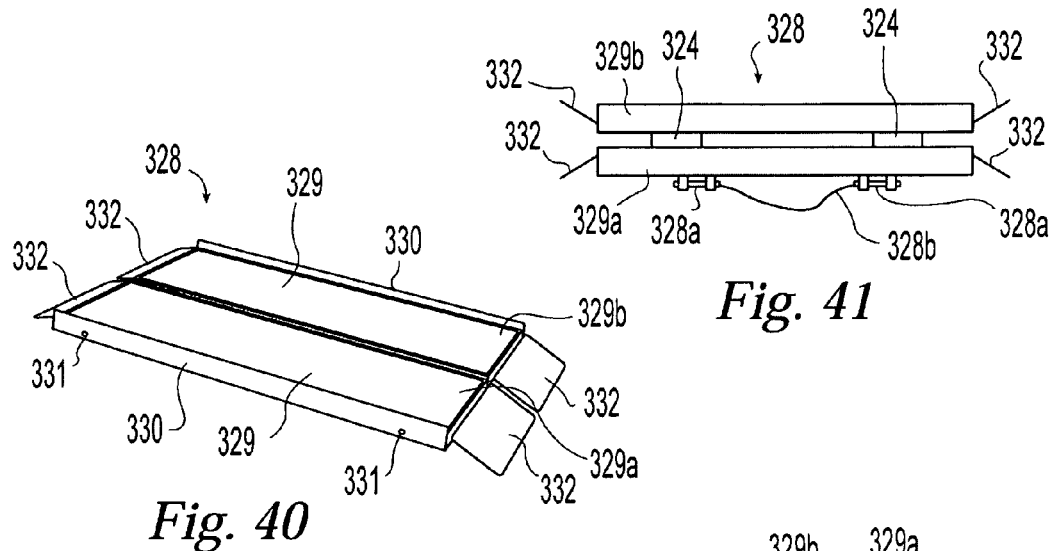
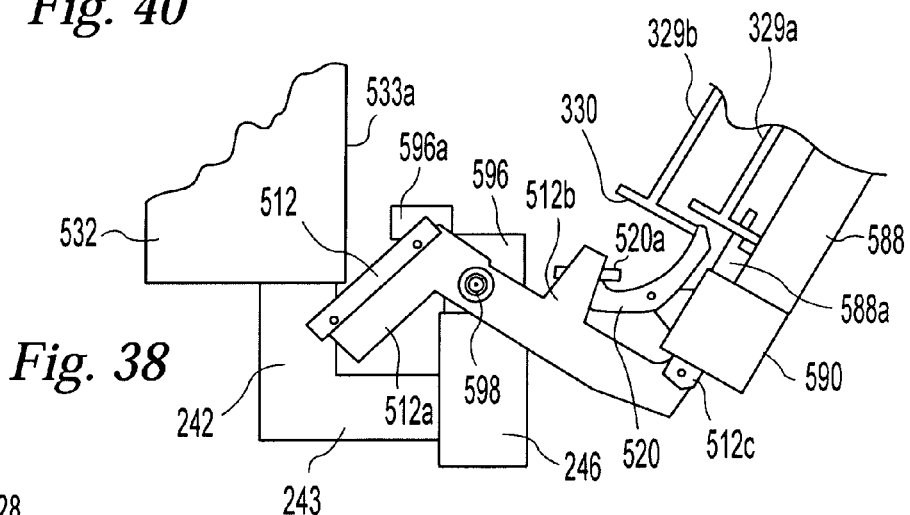
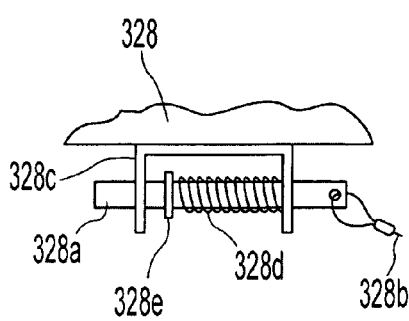

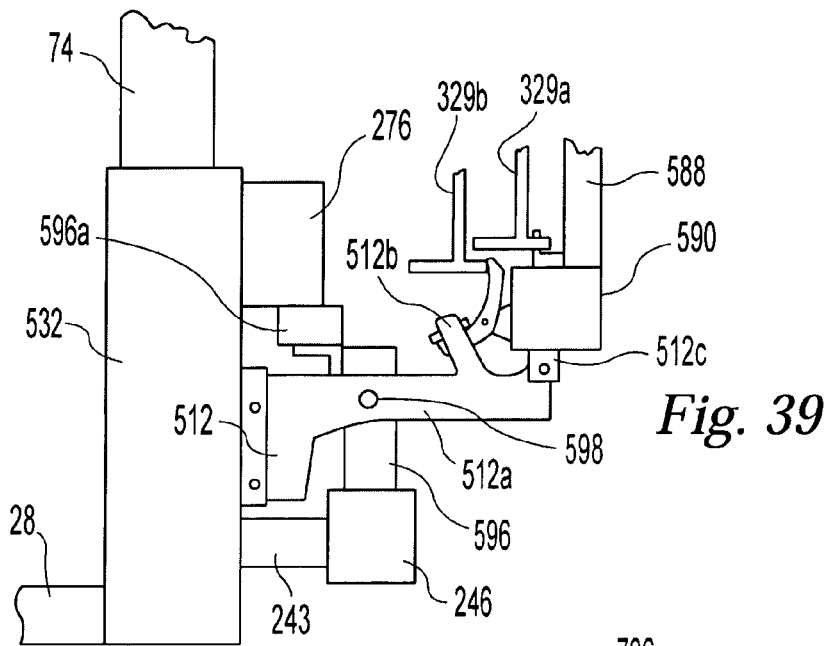
Fig. 39
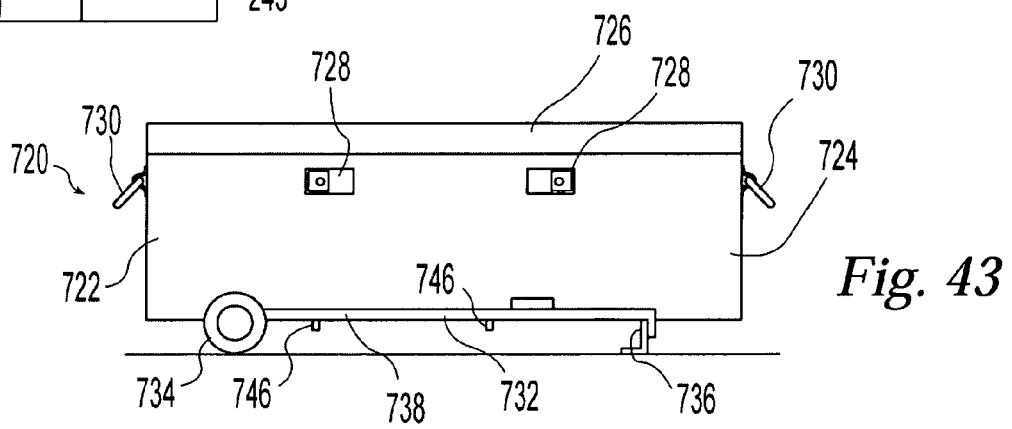
Fig. 43
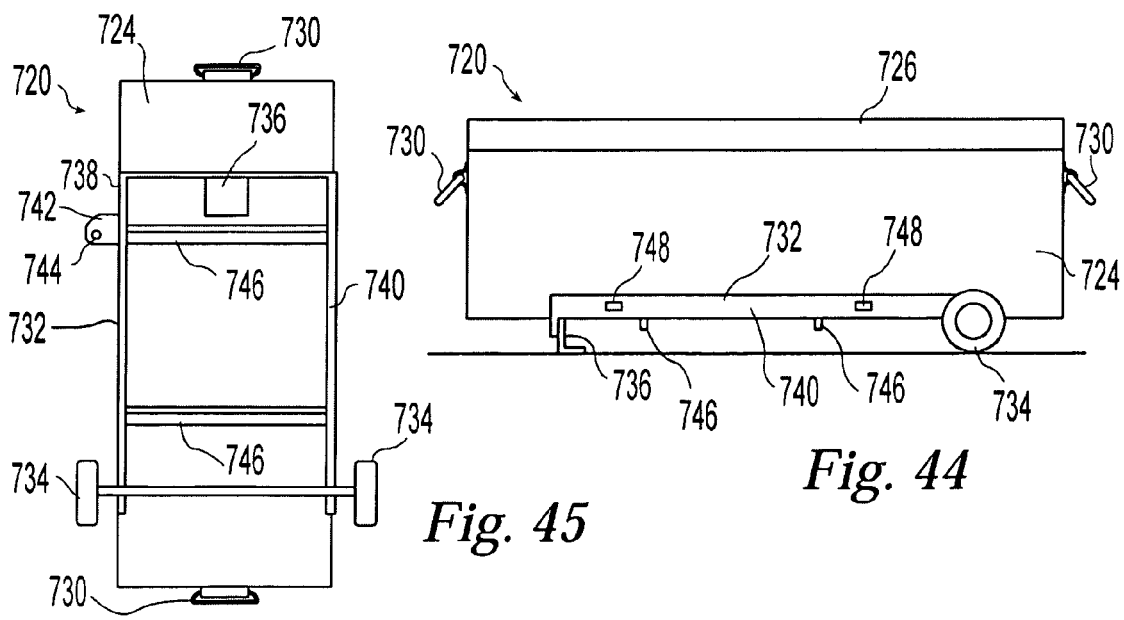
Fig. 44
Fig. 45

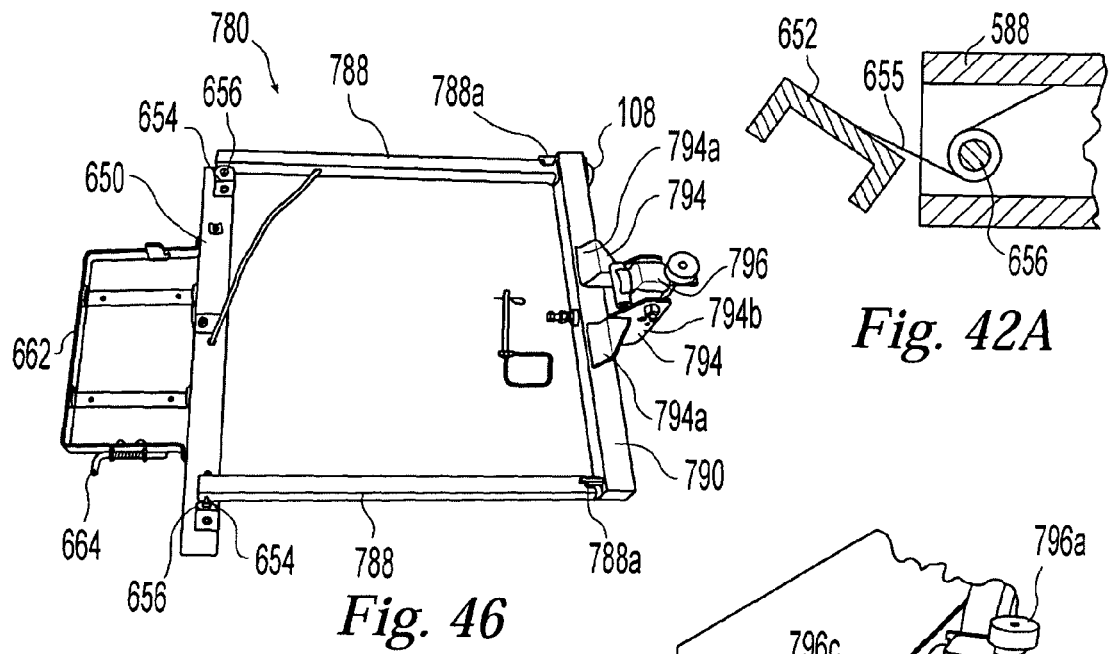
Fig. 46
Fig. 42A
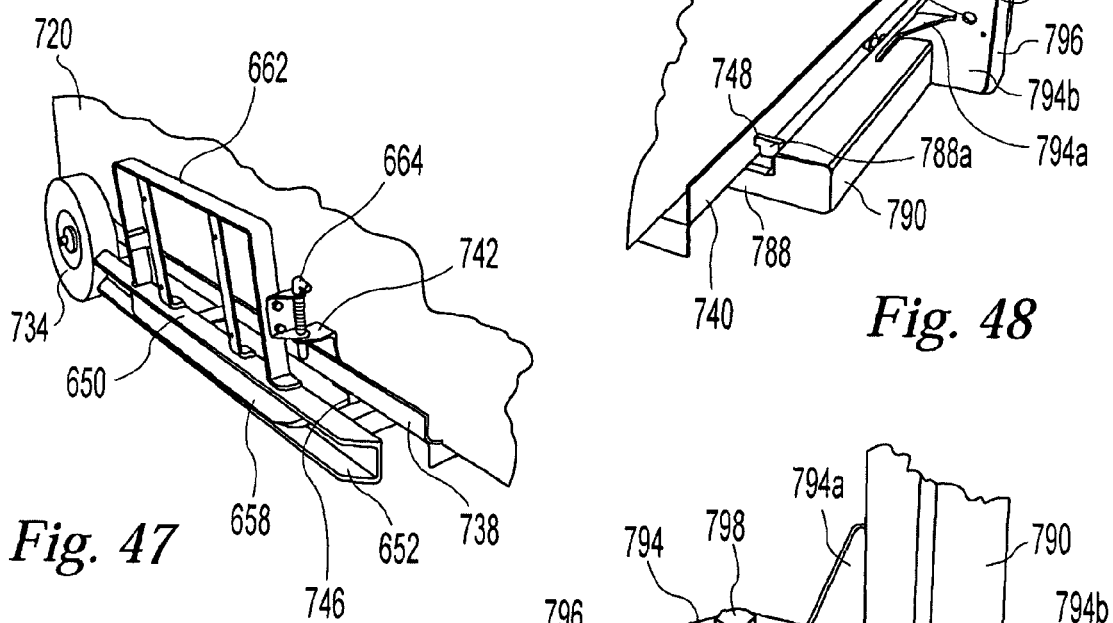
Fig. 47
Fig. 48
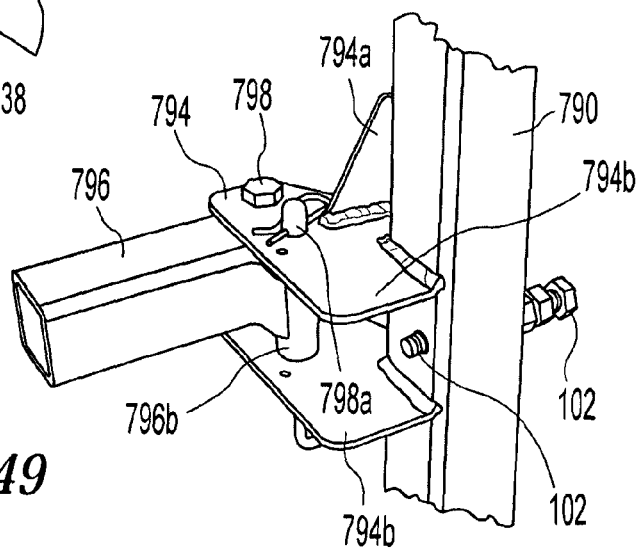
Fig. 49

LIFT APPARATUS MOUNTABLE ON A VEHICLE

CROSS REFERENCE TO RELATED APPLICATIONS

This application claims priority under 35 U.S.C. 119(e) of U.S. provisional patent application Ser. No. 60/901,515 filed on Feb. 14, 2007 entitled LIFT APPARATUS MOUNTABLE ON A VEHICLE the disclosure of which is hereby incorporated herein by reference.

BACKGROUND OF THE INVENTION

1. Field of the Invention

The present invention relates to a lift apparatus for use with a motor vehicle.

2. Description of the Related Art

A number of different lift apparatus are known for use with a vehicle. Such apparatus are typically attached to the rear of a vehicle and provide a means for transporting objects that cannot be placed within the vehicle or which can only be placed in the vehicle with difficulty. These apparatus often include a platform that can be raised and lowered.

For example, many individuals with limited mobility use mobility scooters, powered wheel chairs and similar devices. It is often desirable to transport these devices so that the individual can use the device at different locations. It is known to transport such devices using a lift apparatus having a platform. The platform is lowered to the ground to enable the mobility scooter or similar device to be loaded on the platform. The platform is then raised to enable the vehicle to travel to the desired location where the platform is once again lowered and where the mobility scooter or similar device is unloaded.

It is also known to use such lift apparatus to transport a wide variety of other objects. Some of the objects that are commonly transported using lift apparatus attached to the rear of a vehicle include dirt bikes, motorcycles, riding lawn mowers, jet skis and all-terrain vehicles.

While such known lift apparatus are often quite effective for their purposes, the provision of an improved lift apparatus remains desirable.

SUMMARY OF THE INVENTION

The present invention provides a lift apparatus that is attachable to a vehicle and which provides a drive chain for raising and lowering a lift section of the apparatus to provide a robust, reliable and effective lift apparatus.

The invention comprises, in one form thereof, an apparatus mountable on a vehicle. The apparatus includes a mounting section that is mountably engageable with the vehicle and a lift section that is moveably coupled to the mounting section. A drive chain having a plurality of articulating links and defining a first end and an opposite second end and a drive gear operably engaged with the drive chain are also provided. At least one of the drive gear, and the first and second ends of the drive chain is coupled to the mounting section and at least another one of the drive gear and the first and second ends of the drive gear is coupled to the lift section such that the rotation of the drive gear movingly drives the chain and thereby moves the lift section relative to the mounting section.

In some embodiments of this invention, the first and second ends of the drive chain are coupled to one of the mounting section and the lift section and the drive gear is mounted on the other one of the mounting section and the lift section.

The invention comprises, in another form thereof, an apparatus mountable on a vehicle having a hitch socket. The apparatus includes a mounting section engageable with the hitch socket and a motor drivingly coupled with a gear wherein the motor and the gear are supported on the mounting section. The apparatus also includes a lift section including a rigid elongate structural member and a drive chain having a plurality of articulating links and defining a first end and an opposite second end. The first and second ends of the drive chain are secured to the rigid elongate structural member at spaced apart locations and the gear is operably engaged with the chain at a position intermediate the spaced apart locations. Rotation of the gear raises and lowers the rigid elongate structural member relative to said mounting section.

The invention comprises, in still another form thereof, an apparatus mountable on a vehicle. The apparatus includes a mounting section mountably engageable with the vehicle and a lift section relatively moveably coupled to the mounting section. The lift section is moveable between a lowered position and an elevated position relative to said mounting section. An upwardly opening socket is disposed on the lift section and the apparatus also includes at least one lift platform. The lift platform has a mounting member that is removeably insertable into the upwardly opening socket to thereby removeably mount the lift platform on the lift section.

In some embodiments of this invention, a restraining member may be disposed on the mounting section and be positioned to prevent the removal of the mounting member from the socket when the lift section is raised to its elevated position. In still other embodiments of this invention, the mounting member may be pivotally secured to the lift platform whereby the lift platform can be pivoted relative to the mounting section when the mounting member is inserted into the upwardly opening socket.

The invention comprises, in still another form thereof, an apparatus mountable on a vehicle. The apparatus includes a mounting section engageable with the vehicle and a lift platform operably coupled with the mounting section. The lift platform is vertically moveable relative to the mounting section and pivotal about an axis between a substantially horizontal orientation and a substantially vertically orientation. A taillight assembly is disposed proximate a distal end of the lift platform. The taillight assembly is electrically connectable to the vehicle and selectively repositionable between a first position and a second position. The taillight assembly faces rearwardly when the lift platform is in the substantially horizontal position and the taillight assembly is in the first position and the taillight assembly faces rearwardly when the lift platform is in the substantially vertical position and the taillight assembly is repositioned into the second position.

The invention comprises, in yet another form thereof, an apparatus mountable on a vehicle. The apparatus includes a mounting section engageable with the vehicle and a lift platform operably coupled with the mounting section. The lift platform is vertically moveable relative to the mounting section and includes a framework. The apparatus also includes a platform surface assembly. The surface assembly is removeably securable on the framework and is defined by first and second surface members having substantially similar surface areas. The surface assembly further includes at least one hinge pivotally connecting the first and second surface members wherein the first and second surface members are pivotal between a use configuration wherein the first and second surface members are positioned in a common plane and a compact configuration wherein the first and second surface members are positioned in a folded arrangement.

The invention comprises, in still another form thereof, a wheel chuck assembly mountable on a pair of parallel rods and adapted to receive a motorcycle wheel. The wheel chuck assembly includes a first member defining a receptacle portion for receiving the motorcycle wheel and a mounting portion. The mounting portion includes an engagement member wherein, when the first member is disposed in a use position, the engagement member has a vertically extending edge and a horizontally extending edge, the vertically extending edge defining a first slot extending substantially transverse to the vertically extending edge and the horizontally extending edge defining a second slot extending substantially transverse to the horizontally extending edge. The first and second slots are engageable with the parallel rods by engaging the first slot with one of the rods and pivoting the second slot into engagement with the other of the rods. A second member is pivotally secured to the first member wherein the second member is pivotal between a storage position and a use position. The first and second members are positioned substantially parallel and alongside one another in the storage position and the second member extending at an angle to the first member when in said use position. In the use position, the second member limits movement of the motorcycle wheel when the motorcycle wheel is disposed in the receptacle portion of the first member.

The invention comprises, in another form thereof, an apparatus mountable on a vehicle. The apparatus includes a mounting section mountably engageable with the vehicle, a lift section operably coupled with the mounting section and moveable between a lowered position and an elevated position and a platform structure supported on the lift section. The platform structure is pivotal between a substantially horizontal orientation and a substantially vertical orientation. A engagement bracket is pivotal relative to the lift section and has an engagement member slidingly engageable with the mounting section. The engagement bracket has a non-contact position wherein movement of the lift section between the lowered and elevated positions does not engage the engagement member with the mounting section. The engagement bracket also has an engagement position wherein raising the lift section from the lowered position to the elevated position with the engagement bracket in the engagement position engages the engagement member with the mounting section and thereby rotates the engagement bracket through a pivot angle of at least about 90 degrees. Rotation of the engagement bracket through the pivot angle operably engages the engagement bracket with the platform structure and thereby pivots the platform structure from the substantially horizontal orientation to the substantially vertical orientation.

Some embodiments of this invention may further include a linkage member that is operably coupled with the engagement bracket and moveable between a first position and a second position. Disposing the linkage member in the first position positions the engagement bracket in the non-contact position and disposing the linkage member in the second position positions the engagement bracket in the engagement position. In still other embodiments, the apparatus may also include a mounting member that is pivotally secured to the platform structure and is selectively mountable on the lift section whereby the platform structure is removably mounted on the lift section and wherein the engagement bracket is pivotally mounted on the mounting member. In yet other embodiments, the platform structure and the engagement bracket are independently pivotal about a common pivot member.

The invention comprises, in still another form thereof, an apparatus mountable on a vehicle having a hitch socket. The apparatus includes a mounting section engageable with the hitch socket and a lift section operably coupled with said mounting section. The lift section is moveable between a lowered position and an elevated position when the mounting section is engaged with the hitch socket. A platform structure is removably mountable on the lift section and is pivotal between a substantially horizontal orientation and a substantially vertical orientation when mounted on the lift section. A tool box structure is selectively securable on the platform structure when the platform structure is disposed in the substantially horizontal orientation. The tool box structure includes an enclosure structure and at least one pair of wheels mounted on the enclosure structure. When the platform structure is mounted on the lift section and disposed in a substantially horizontal orientation and the tool box structure is secured to the platform structure, the wheels of the tool box structure are engageable with a ground surface when the lift section is in the lowered position and the wheels are elevated above the ground surface when the lift section is raised to the elevated position.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 2 is a top view of the lift apparatus.

FIG. 3 is a rear view of the lift apparatus.

FIG. 4 is a rear view of the mounting section of the apparatus.

FIG. 5 is a side view of the mounting section of the apparatus.

FIG. 8 is a detail top view of a portion of the mounting section.

FIG. 9 is a top view of the lift section framework of the apparatus.

FIG. 10 is a side view of the lift section framework of the apparatus.

FIG. 11 is a top view of the lift section.

FIG. 12 is a rear view of the lift section.

FIG. 13 is a side view of the lift section.

FIG. 15 is a side view of a wheel chuck assembly.

FIG. 16 is a front view of the wheel chuck assembly.

FIG. 17 is a perspective view of the wheel chuck assembly.

FIG. 17A is a side view of a motorcycle mounted on a platform assembly using a pair of wheel chuck assemblies.

FIG. 18 is a side view illustrating the installation of the wheel chuck assembly.

FIG. 25 is a side view of the drive unit of the second embodiment.

FIG. 26 is a cross sectional view taken along line 26-26 of FIG. 25.

FIG. 27 is another cross sectional view of the drive unit of FIG. 25.

FIG. 35 is a schematic top view of a portion of the third platform assembly.

FIG. 38 is a schematic side view of a portion of the third platform assembly.

FIG. 39 is another schematic side view of a portion of the third platform assembly.

FIG. 40 is perspective view of a bi-fold platform surface assembly.

FIG. 41 is a side view of the bi-fold platform surface assembly.

FIG. 42 is a detail view of a retention pin located on the bi-fold platform surface assembly.

FIG. 42A is a cross sectional view illustrating a torsional spring used with a taillight assembly.

FIG. 43 is side view of a tool box assembly.

FIG. 44 is another side view of the tool box assembly.

FIG. 45 is a bottom view of the tool box assembly.

FIG. 46 is perspective view of a fourth platform assembly.

FIG. 47 is a perspective view of a portion of the fourth platform assembly with the tool box assembly mounted thereon.

FIG. 48 is another perspective view of a portion of the fourth platform assembly with the tool box assembly mounted thereon.

FIG. 49 is a bottom perspective view of a portion of the fourth platform assembly.

Figure 1:
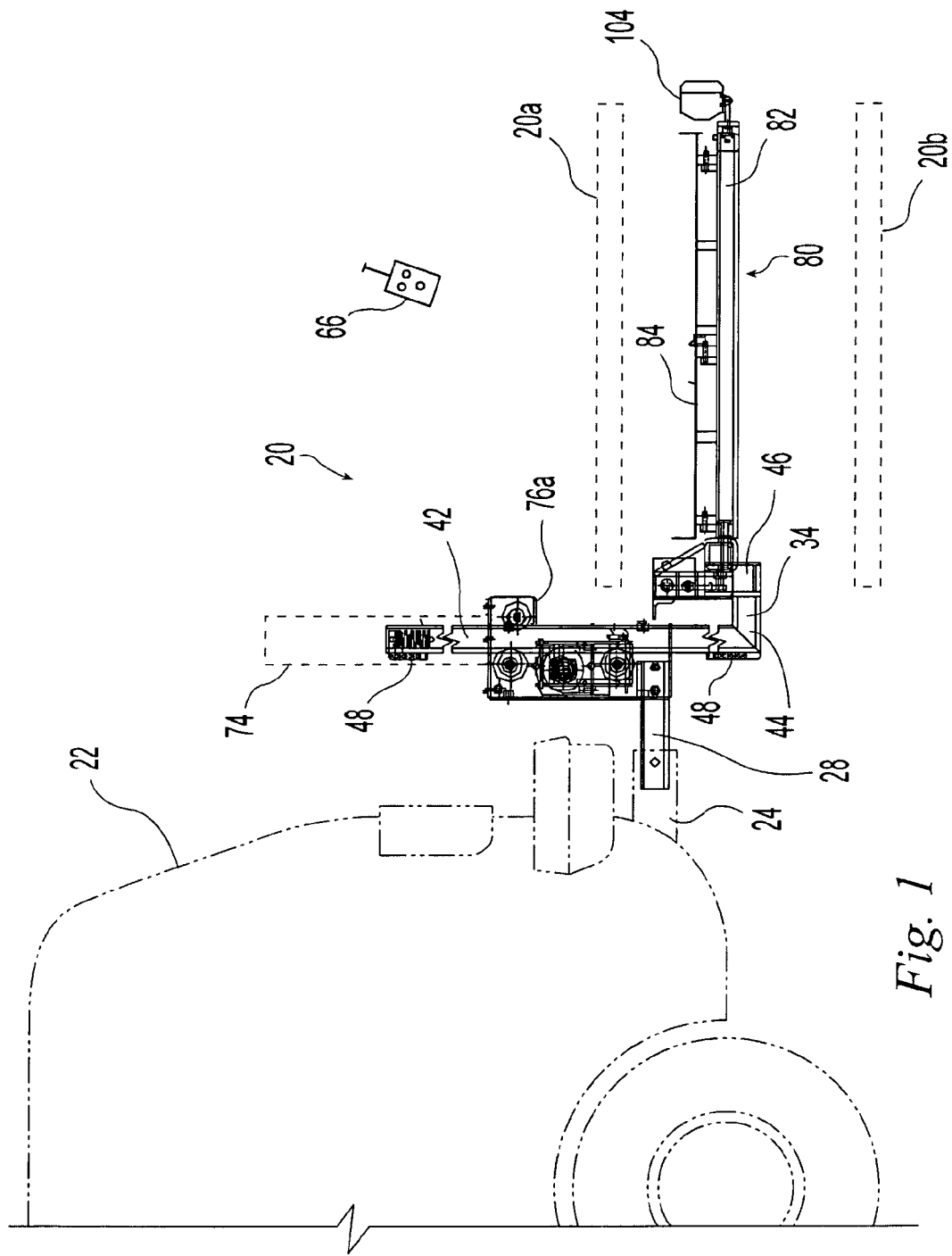
FIG. 1 is a side view of a lift apparatus mounted on a vehicle.
Figure 7:
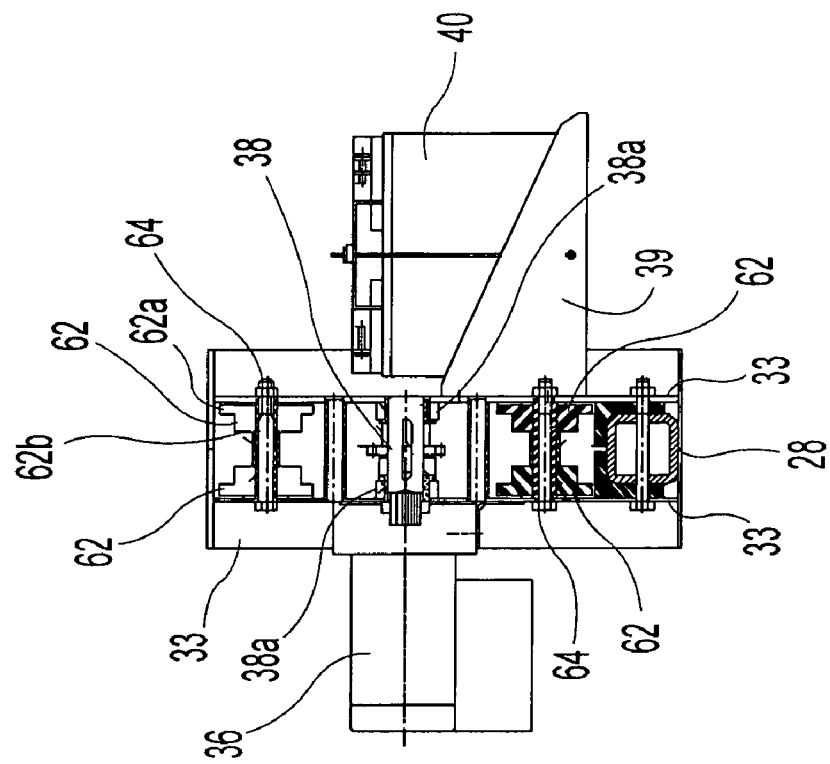
FIG. 7 is a detail rear view of a portion of the mounting section.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

A lift apparatus 20 for mounting on the rear of a vehicle 22 is shown in FIG. 1. Apparatus 20 is also illustrated in FIGS. 2 and 3 and includes a mounting section 26 that is engaged with vehicle 22.

Figure 6:
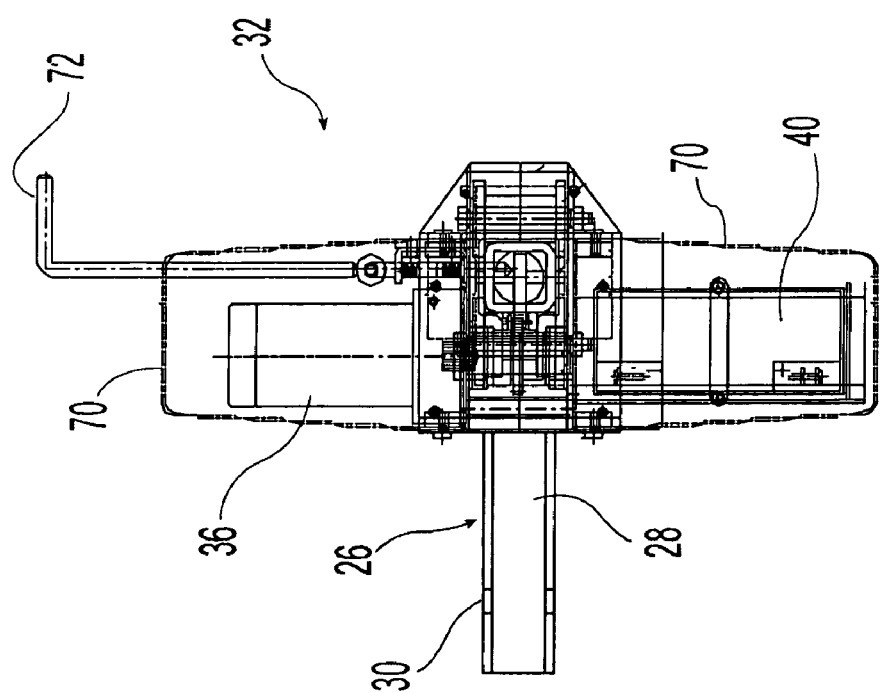
FIG. 6 is a top view of the mounting section of the apparatus.

Mounting section 26 is shown in FIGS. 4-6 and includes a mounting stem 28 that is inserted into a conventional hitch receiver 24 on vehicle 22 to thereby engage mounting section 26 with vehicle 20 and support apparatus 20 on vehicle 22. In the illustrated embodiment, mounting stem 28 is configured to be inserted into a Class 2 hitch receiver. Alternative embodiments of apparatus 20, however, may utilize mounting stems which are sized for insertion into alternative hitch receivers, e.g., Class 4 or Class 5 receivers, or, may utilize entirely different means, such as a bolted connection, for mounting apparatus 20 on vehicle 22. Mounting stem 28 is a tubular steel member having a substantially square cross section and includes an aperture 30 for receiving a locking pin (not shown) to secure mounting stem 28 within hitch receiver 24 in a manner well known in the art for securing tubular inserts within a conventional hitch receiver.

As can also be seen in FIGS. 4-6, a drive head assembly 32 is located on mounting section 26 and is engaged with lift section 34 which is thereby moveably coupled with mounting section 26. Drive head assembly 32 includes an interior support structure 33 formed out of structural steel members that is secured to and supported on mounting stem 28. An electrical motor 36 having a drive gear 38 mounted on its drive shaft is attached to and projects outwardly from one side of support structure 33. A shelf-like support 39 projects outwardly from the opposite side of support structure 33 and supports a battery 40 thereon. Battery 40 provides a source of electrical power for motor 36. Wiring connecting battery 40 and motor 36 has been omitted from the figures for purposes of graphical clarity.

Lift section 34 includes a rigid elongate structural member 42 that extends vertically within support structure 33. Structural member 42 is formed of a tubular steel member having a substantially square cross section and has a transversely extending tubular steel member 44 secured to it near the bottom of structural member 42 by welding or other suitable means. Transverse member 44 is relatively short and has a short length of a tubular steel member secured thereto at its distal end by welding or other suitable means to form an upwardly opening socket member 46. Socket member 46 is used to removeably secure lift platforms to lift section 34 as will be discussed in greater detail below.

A drive chain 48 formed out of a plurality of articulating links 50 is attached to lift section 34. Drive chain 48 does not form a continuous loop, instead, drive chain 48 has a first end 52 and an opposite second end 54. First end 52 of chain 48 is fixed to elongate structural member 42 near its lower end by welding or other suitable means. The upper, second end 54 of chain 48 is coupled to elongate structural member 42 near its upper end. (Only a limited length of chain 48 near its two opposite ends 52, 54 is illustrated in the figures with the middle section of chain 48 being omitted for purposes of graphical clarity.) Second end 54 is attached to a linking member 56 that extends through a vertical slot in elongate structural member 42. A helical spring 58 is located within elongate structural member 42. Spring 58 is mounted above a base pin 60 extending through member 42 and biases linking member 56 upwards thereby acting to remove slack in chain 48.

Drive gear 38 is engaged with drive chain 48 and is disposed between chain 48 and elongate structural member 42.

Elongate structural member 42 is maintained in a proper orientation within support structure 33 by roller guides 62. In the illustrated embodiment, roller guides 62 are formed out of a low-friction polymeric material, e.g., nylatron, and have a hat-shaped cross section with a small diameter cylindrical portion 62b and a radially extending cylindrical flange 62a at one end. A central opening extends through the roller guides 62. Three pairs of roller guides 62 are mounted on three separate bolts 64 that extend through apertures in opposite sidewalls of support structure 33. Elongate structural member 42 is disposed between the radial flanges 62a of each pair of roller guides 62 and engages the smaller diameter cylindrical portion 62b of each guide 62 such that guides 62 rotate on bolts 64 as structural member 42 is raised and lowered.

The operation of drive head assembly 32 will now be discussed. A small wireless transmitter 66 (FIG. 1) which may take the form of a keychain fob is used to control the operation of electrical motor 36. The use of a wireless transmitter to activate and deactivate and control an electrical device is well known to those having ordinary skill in the art. Transmitter 66 can be used to actuate and deactuate motor 36. Transmitter 66 also selectively determines the rotational direction of motor 36 whereby lift mechanism 34 can be selectively elevated or lowered. As motor 36 rotates drive gear 38, which is engaged with drive chain 48, drive chain 48 is driven upwardly or downwardly relative to gear 38 depending upon the rotational direction of motor 36. The lower end 52 of drive chain 48 is fixed to elongate member 42 and, thus, as drive chain 48 is moved upwardly or downwardly, lift mechanism 34 is also moved upwardly or downwardly.

The weight of lift section 34 and any platform and object supported thereon is transmitted to mounting section 26 at drive gear 38 via the lower portion of chain 48 disposed between lower end 52 and drive gear 38. Bearings 38a mounted on support structure 33 are used to support drive gear 38 on opposite sides of chain 48. The illustrated drive gear 38 forms a part of the same shaft as the motor shaft. More specifically, drive gear 38 is located on shaft that is coaxially joined with the internal shaft of motor 36 using a splined connector. Those having ordinary skill in the art will recognize that drive gear 38 can be drivingly coupled to motor 36 in various other alternative configurations.

The use of a chain drive 48 provides a robust and reliable drive mechanism for raising and lowering lift section 34 and any platform and object supported thereon. The configuration of drive head unit 32 also permits the platform assembly to be raised approximately 3 inches above the height of the hitch receiver in which mounting member 28 is inserted.

Apparatus 20 is also provided with a locking member 68 to secure lift section 34 in its elevated position. Dashed lines 20a in FIG. 1 illustrate the position of the platform assembly when lift section 34 has been moved to an elevated position. Dashed lines 20b in FIG. 1 depict the position of the platform assembly when lift section 34 has been moved to its lowered position. Locking member 68 takes the form of an L-shaped rod and projects through an aperture in support structure 33 with one end of the rod being biased into contact with a sidewall of elongate structural member 42 with a helical spring 68a. Structural member 42 includes an opening 68b in its sidewall which is positioned so that when structural member 42 has been raised to position lift section 34 in its elevated position, locking member 68 will enter the opening and thereby lock structural member 42 in its elevated position.

When locking member 68 is in its locking position engaged with the opening in elongate structural member 42, locking member 68 prevents both the downward and upward movement of lift section 34 relative to mounting section 26. The use of such a locking member 68 is of particular value in combination with wireless transmitter 66 because it prevents the downward movement of lift section 34 while vehicle 22 is in transit as might occur due to the accidental depression of an actuating button on wireless transmitter 66 or due to extraneous radio transmissions encountered by vehicle 22 during transit. When locking member 68 is lockingly engaged with structural member 42, it may also transfer some of the weight of lift section 34 and any platform assembly and object supported thereon to support structure 33.

When it is desired to lower lift section 34, locking member 68 must first be disengaged from the opening in structural member 42. A thin rigid polymeric housing 70 surrounds motor 36, battery 40 and support structure 33 to shield drive head assembly 32 from rain. An extension arm 72 is connected to locking member 68 and projects outwardly from housing 70 to allow a user to manually disengage locking member 68 by pulling outwardly on extension arm 72.

A tubular sleeve 74 with an upper closed end that is formed out of flexible material such as a vinyl coated fabric is secured at the top of support structure 33. As lift section 34 is raised, the upper end of elongate structural member 42 is progressively inserted into sleeve 74. Sleeve 74 provides several advantages. First, it inhibits the entry of rain or moisture into drive head assembly 32. In addition to inhibiting the entry of moisture, housing 70 and sleeve 74 also inhibit the accumulation of road dirt within drive head assembly 32. When lift section 34 is in its raised position, sleeve 74 also serves as a scratch guard. If the tailgate of vehicle 22 is opened while lift section 34 is in its elevated position, the tailgate may impact elongate structural member 42. Without sleeve 74, this would likely result in scratches or other blemishes in the surface finish of the tailgate. Sleeve 74, however, inhibits such scratches and blemishes.

Forming sleeve 74 out of a flexible material so that it can be collapsed downwardly against support structure 33 when lift section 34 has been lowered and elongate structural member 42 retracted from sleeve 74 also provides advantages. More specifically, it provides lift apparatus 20 with a low profile when lift section 34 has been lowered. For many vehicles 22, this will allow the tailgate of the vehicle to pivoted downwardly or opened sidewardly while apparatus 20 is mounted to vehicle 20 (and lift section 34 is in its lowered position) without having the tailgate impact apparatus 20. It is noted that in FIG. 1, dashed lines indicate the extended position of sleeve 74.

Support structure 33, which forms a part of mounting section 26, also includes a restraining/restraint member 76 that projects from structure 33 in the same direction as transverse member 44 and which is disposed vertically above upwardly opening socket 46. Restraint member 76 is positioned so that when lift section 34 has been raised to its elevated position, restraint member 76 will block the upward removal of a platform assembly which has been mounted on lift section 34 by inserting a mounting member into upwardly opening socket 46.

In the illustrated embodiments, restraint member 76 takes the form of a sheet steel enclosure within which a pair of roller guides 62 are mounted. It is the lower surface 76a of enclosure 76 that provides the restraining surface that prevents the upward removal of a platform assembly. In alternative embodiments, such a restraint member could be formed by alternative structures.

Turning now to FIGS. 9-14, platform assembly 80 will be discussed. Platform assembly 80 includes a framework 82 and a platform surface assembly 118. Framework 82 includes a transverse frame member 86 that takes the form of a structural steel tube and two repositionable supports 88 that also take the form of structural steel tubes. Secured to one end of support members 88 are short tubular sleeves 90. Sleeves 90 have an interior opening roughly corresponding to the exterior dimensions of transverse member 86 so that sleeves 90 can engagement along member 86. Sleeves 90 include an opening in one side wall with a threaded nut 90a welded to sleeve 90 thereat. A threaded bolt 92 is threaded through the nut and extends through the opening in sleeve 90 to engage frame member 86 and thereby secure support member 88 in a desired location along frame member 86.

Bracing members 94 are secured to frame member 86 on opposite sides of the midpoint of frame member 86. In the illustrated embodiment, each of the bracing members 94 are formed out of two generally triangular structural steel plates welded together and then to tubular member 86. As best understood with reference to FIG. 9, each of the bracing members 94 include a first triangular steel plate 94a that is welded to transverse member 86 along one edge and second steel plate 94b along a second edge. Steel plates 94b are also welded to transverse member 86 and are oriented parallel to each other in planes oriented substantially perpendicular the axis 86a of transverse member 86.

A mounting member 96 is pivotally secured to platform assembly 80 between parallel plates 94b of bracing members 94 by a bolt 98 which extends through aligned openings in opposite sidewalls of mounting member 96 and aligned openings in parallel plates 94b. Mounting member 96 is, in the illustrated embodiment, formed out of a structural steel tubular member and is dimensioned to be insertable into upwardly opening socket member 46 to thereby mount platform assembly 80 on lift section 34. Socket member 46 has a flat steel member 46a welded to it and extending across the bottom portion of socket member 46 to thereby support and limit the extent to which mounting member 96 can be inserted into socket member 46. Alternative configurations, however, can also be used. For example, member 46a could be replaced by one or more bolts. Or, member 46a could omitted entirely and mounting member 96 could be provided with an annular flange near the upper portion of member 96 which would engage the upper rim of socket 46 after a partial length of mounting member 96 had been inserted into socket 46. Various other modifications are also possible.

The pivotal attachment of mounting member 96 allows platform assembly 80 to be pivoted between a substantially horizontal position and a substantially vertical position when platform assembly 80 is mounted on lift section 34. A locking pin 100 is provided to retain platform assembly in place when it is rotated to its substantially vertical position. Locking pin 100 is biased by a helical spring 100a through an opening in a parallel plate 94b (of one of the bracing members 94) and into contact with a sidewall of mounting member 96. A small bracket 100b is secured to plate 94b and has a transverse lip 100c with an opening through which locking pin 100 extends. Helical spring 100a is engaged with both lip 100c and an annular flange on pin 100 to thereby bias pin 100.

An opening is provided in the sidewall of mounting member 96 so that when platform assembly is rotated into a substantially vertical position, locking pin 100 will be biased into the opening and thereby lock mounting member 96 and framework 82 together and prevent the relative rotation thereof. To lower framework 82, and any surface assembly 118 mounted thereon, from the vertical position, locking pin 100 is pulled outwardly to disengage locking pin 100 from the opening in mounting member 96 and once again allow platform assembly 80 to rotate relative to mounting member 96. The positioning of platform assembly 80 in a substantially vertical position is useful when vehicle 22 is in transit with a lift assembly 20 mounted thereon and with no object being conveyed on lift assembly 20.

A threaded adjustment member 102 extends through transverse frame member 86 at the midpoint of frame member 86. A cooperative threading is provided on member 86 at this location by welding a threaded nut 102a at the location of openings in member 86 or by the use of other suitable means. When platform assembly 80 is lowered from its vertical position, it may rotate freely downwardly about the pivot axis 98a defined by bolt 98 until the end of adjustment bolt 102 comes into contact with sidewall 96a of mounting member 96. The positioning of mounting member 96 and bolt 102 is such that platform assembly 80 will be in a substantially horizontal position when bolt 102 contacts sidewall 96a of mounting member 96. The provision of a threaded adjustment member 102, however, allows for the adjustment of the exact rotational position of framework 82 relative to mounting member 96 (and thus relative to lift section 34 and vehicle 22) by adjusting the position of bolt 102 to extend a greater or lesser distance from transverse member 86 towards mounting member 96. By using a threaded member 102, the adjustment of the projecting length of member 102 can be made with relative ease.

Although threaded member 102 abuttingly engages mounting member 96 in the illustrated embodiment, alternative embodiments could employ a threaded member 102 that abuttingly engages another non-tilting portion of apparatus 20 that does not pivot together with lift platform framework 82. In still other embodiments, threaded member 102 could be threadingly engaged with a non-tilting portion of apparatus 20 and abuttingly engage the pivoting lift platform to precisely control the angle of the lift platform when it is in a substantially horizontal position.

The ability to precisely adjust the horizontal position of platform assembly 80 as provided by adjustment member 102 can be advantageous in various situations. For example, for some objects to be loaded on platform assembly 80 it may be desirable to slightly tilt platform assembly 80 so that the object is tilted towards vehicle 22. In other situations where vehicle 22 is parked on uneven ground it may be desirable to adjust the angle of platform assembly 80 to more closely conform to the ground immediately below platform assembly 80 to thereby facilitate to unloading or loading of an object on platform assembly 80.

A stop member 96b is secured to the upper end of mounting member 96 and, as best seen in FIG. 13, projects outwardly therefrom to engage restraint member 76 when lift section 34 has been raised to its elevated position with platform assembly 80 mounted thereon.

Figure 14:
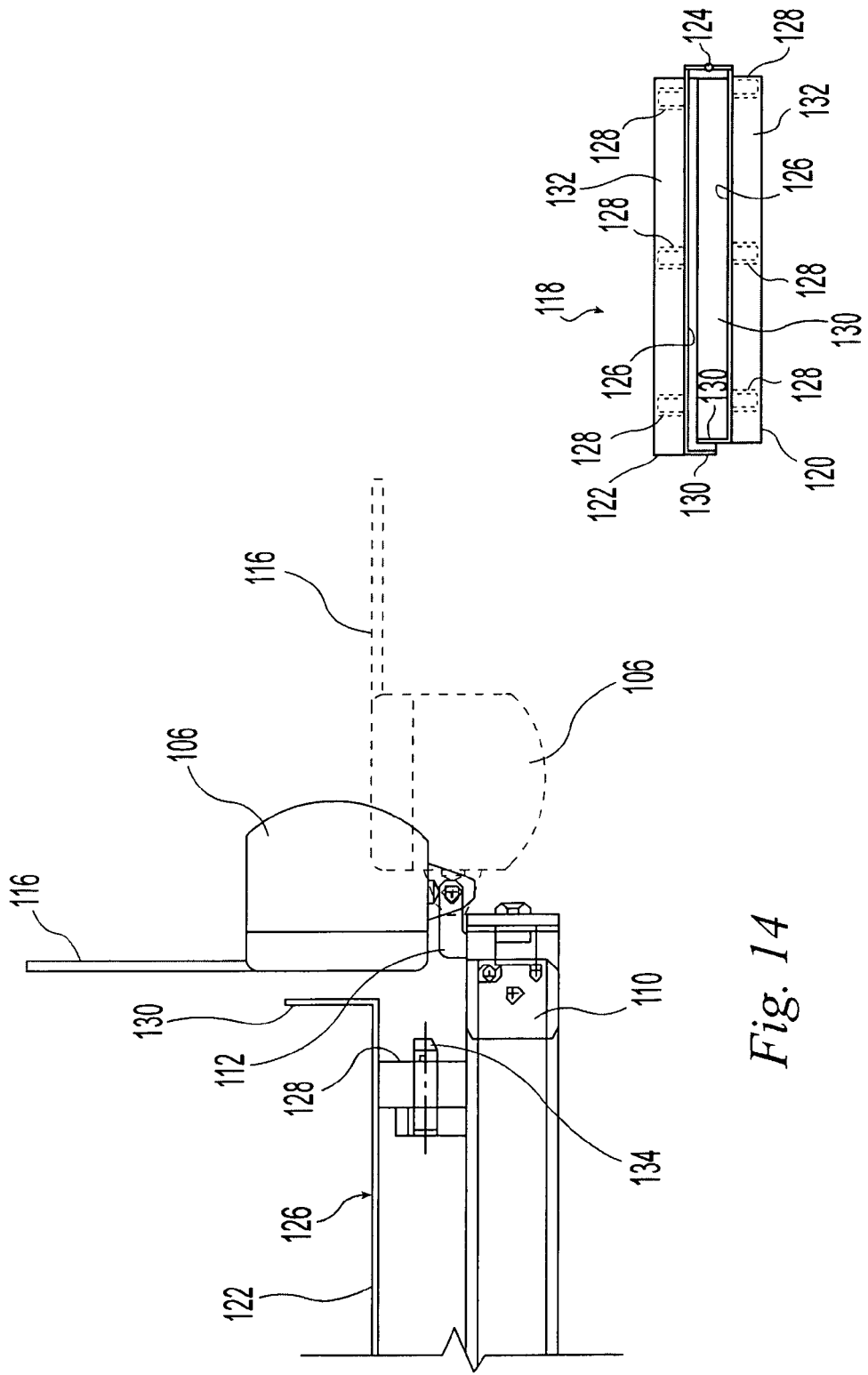
FIG. 14 is a side view of the taillight assembly.

Mounted on the distal end of framework 82 is a taillight assembly 104 as best seen in FIG. 14. Taillight assembly 104 includes individual taillights 106 which function as brake lights and turning signals. Most vehicles 22 which have a hitch receiver 24 also include a standardized electrical socket for mating with a standardized cooperating electrical connector that is in communication with the taillights of a trailer. Taillight assembly 104 includes a conventional electrical connector 108 for mating with such a conventional electrical socket located on vehicle 22. Taillight assembly 104 is secured to framework 82 by inserting rubber plugs 110 into the open distal ends of support members 88 in a press fit engagement. L-shaped brackets 112 are attached to plugs 110 and taillights 106 are mounted on an elongate member 114 pivotally connected to L-shaped brackets 112. A license plate holder 116 may also be mounted on pivotal elongate member 114.

When platform assembly 80 is in a substantially horizontal position, taillight assembly 104 is positioned as shown in solid lines in FIG. 14 with taillights 106 and license plate holder 116 facing rearwardly so that taillights 106 and license plate holder 116 are properly positioned for viewing by vehicles trailing vehicle 22. When platform assembly 80 is pivoted upward into a substantially vertical position, taillights 106 and license plate holder 116 are pivoted approximately 90 degrees to the position shown in dashed outline in FIG. 14 where they will face rearwardly and be properly viewable by vehicles trailing vehicle 22. In the illustrated embodiment, threaded fasteners pivotally connect L-shaped brackets 112 and elongate member 114 and are tightened sufficiently to retain elongate member 114 in place after pivoting elongate member 114 to a new position. Other means, such as locking pins or detents, may alternatively be used to retain taillight assembly 104 in a desired position about its pivot axis.

The illustrated platform assembly 80 is raised to a vertical position solely by manual effort. However, in alternative designs, a torsion spring could be mounted at the pivot axis of platform assembly 80 to provide a biasing force that biases platform 80 towards a vertical position. Advantageously, such a spring would be insufficient to move the platform from a substantially horizontal position when it was unburdened so that the platform would remain in a substantially horizontal position and ready for loading when unburdened. The spring, however, would allow a user to lift the platform from the horizontal position to a substantially vertical position with only a minimum amount of effort.

Mounted on platform framework 82 is a removeable platform surface assembly 118. Platform surface assembly 118 includes first and second surface members 120, 122 which are pivotally connected together with hinges 124. Hinges 124 allow members 120, 122 to be pivoted between a use configuration and a compact configuration.

Figure 13A:
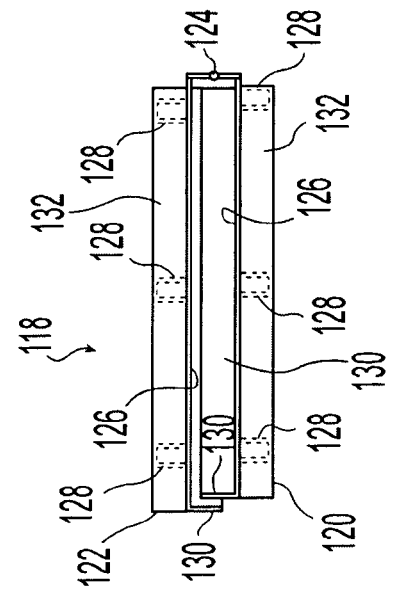
FIG. 13A is an end view of a platform surface assembly in a compact configuration.

Each of the surface members 120, 122 have a similar design and provide a top surface 126 on which an object, such as a mobility scooter, can be loaded. The surface area of each of the top surfaces 126 is substantially similar and both of these surfaces 126 lie in a common plane when surface members 120, 122 are unfolded and mounted on support frame 80 in a use configuration as depicted in FIGS. 1-3 and 11-13. When surface members 120, 122 are removed from framework 82, they may be folded about hinges 124 into a compact folded arrangement wherein members 120, 122 are positioned adjacent one another. FIG. 13A illustrates surface assembly 118 in a compact configuration after assembly 118 has been folded about hinges 124 to position surface members 120, 122 substantially parallel and adjacent one another. The folding of surface assembly 118 into such a compact arrangement allows assembly 118 to be more easily carried by a single individual. The use of aluminum sheeting to manufacture surface assembly 118 minimizes the weight of assembly 118 and thereby further enhances the manual portability of a folded assembly 118.

Below top surfaces 126, each of the members 120, 122 include stiffening ribs 128 formed out of metal bent into a rectangular tube. Each of the members 120, 122 include a upward extending sidewall 130 along two sides of top surface 126 whereby sidewalls 130 extend along three of the edges of surface assembly 118 when it is unfolded into its use position. Inclined ramp sections 132 are located on the remaining side of assembly 118 to facilitate to loading and unloading of objects onto surface assembly 118.

Openings are placed in ribs 128 in positions corresponding to mounting pins 134 located on support members 88. To removeably mount surface assembly 118 on framework 82, mounting pins 134 are inserted through the openings in ribs 128. Advantageously, openings extend through pins 134 near their distal end and at a location that projects through ribs 128 so that kotter pins (not shown) can be installed in these openings in pins 132 to inhibit the removal of pins 134 from ribs 128.

The portability of bi-fold surface assembly 118 allows this assembly to be relatively easily removed from framework 82 and repositioned at the location where vehicle 22 has stopped. For example, if there is a small set of stairs at the location where vehicle 22 has stopped, after unloading a mobility scooter from apparatus 20, bi-fold surface assembly 118 could be removed from framework 82 and then positioned on the stairs to allow the mobility scooter to climb the stairs using the bi-fold surface assembly 118. Although foldable ramp assemblies for assisting mobility scooters and powered wheelchairs are known in the art, the inventors of the present application are unaware of any use of such foldable assemblies in combination with lift assemblies such as apparatus 20.

Various other platform surfaces could also be mounted on framework 82, or, if provided with a mounting member 96, mounted directly on lift section 34. For example, FIG. 17 illustrates a portion of an alternative surface assembly 136 which includes stiffening ribs 138 similar to ribs 128 of assembly 118 but has a plurality of parallel spaced metal rods 140 welded to ribs 138 to provide a surface on which an object can be loaded. The use of surface assembly 136 having rods 140 allows wheel chuck assembly 142 to be mounted thereon for restraining the wheel of a motorcycle or similar wheeled vehicle.

Wheel chuck assembly 142 is formed out of several extruded aluminum sections and includes a first portion 144 and a second portion 146 that pivot relative to each other about nut and bolt assemblies 142a so that the two portions can be folded together into a compact shape for storage when not in use. First portion 144 defines a receptacle for receiving a motorcycle wheel while the second portion, when in use, extends at an angle and prevents the movement of the wheel in one direction. Two such wheel chucks 142 would be used to mount a motorcycle on surface assembly 118 and, thus, the upward extending second portions 146 of the two wheel chucks would prevent both the forward and rearward motion of the motorcycle. Straps or similar tiedown elements would be used to secure the motorcycle in the lateral direction.

The first portion 144 includes a mounting portion 148 on its lower surface that projects downwardly to engage rods 140. The first and second portions 144, 146 are pivotally connected at one end of wheel chuck 142 and on the opposite end, mounting portion 148 defines vertically extending edges (the edges are vertically disposed when chuck 142 is in a use position and is securing a motorcycle) having a slot 150 that extends substantially transverse to the vertical edge. Each of the first and second portions 144, 146 are formed by two L-shaped sections. The L-shaped sections of second portion 146 are secured at a fixed distance by L-channel 142 which is bolted to each of the L-shaped sections of second portion 146 and by pivot bolt assemblies 142a.

Mounting portion 148 can be formed by two L-shaped sections with flat sections holding the opposing sides of first portion 144 apart at a fixed distance. Or, as illustrated in the Figures, mounting portion 148 can be formed by a C-shaped section having two sidewalls 147 joined by a central web 147b. C-shaped section 148 is joined to the two opposed L-shaped sections of first portion 144 with fasteners 142c and keeps the L-shaped sections spaced at a fixed distance. Fasteners 142c are advantageously positioned near the outer sidewalls of first portion 144 to avoid or limit contact with a motorcycle wheel disposed within first portion 144. Alternative selections of individual parts and assembly methods, e.g., welding, may also be used to form wheel chuck 142. The lower horizontal edge 148b of each sidewall 147 of mounting portion 148 defines a second slot 152 that extends substantially vertically. Rear notches 153 in sidewalls 147 mounting portion 148 receive a third rod 140.

First and second slots 150, 152 and rear notches 153 are engaged with parallel rods 140 by first engaging slots 150 with a rod 140 and then pivoting chuck 142 to engage slots 152 and notches 153 with two additional rods 140. Once chuck 142 has been so engaged with rods 140, chuck 142 must be removed using a similar pivoting motion. If chuck 142 is subjected to a force that is solely vertical (when rods 140 lie in a horizontal plane), horizontally extending slots 150 will prevent the upward removal of chuck 142. Moreover, once a motorcycle wheel has been placed in the receptacle formed by the sidewalls 154 forming the receptacle of first portion 144, chuck 142 will be securely kept in place on surface assembly 136. FIG. 17A schematically depicts two wheel chucks 142 mounted on a platform assembly 136 with a motorcycle 129 having its wheels 129a disposed in the two wheel chucks 142.

Figure 19:
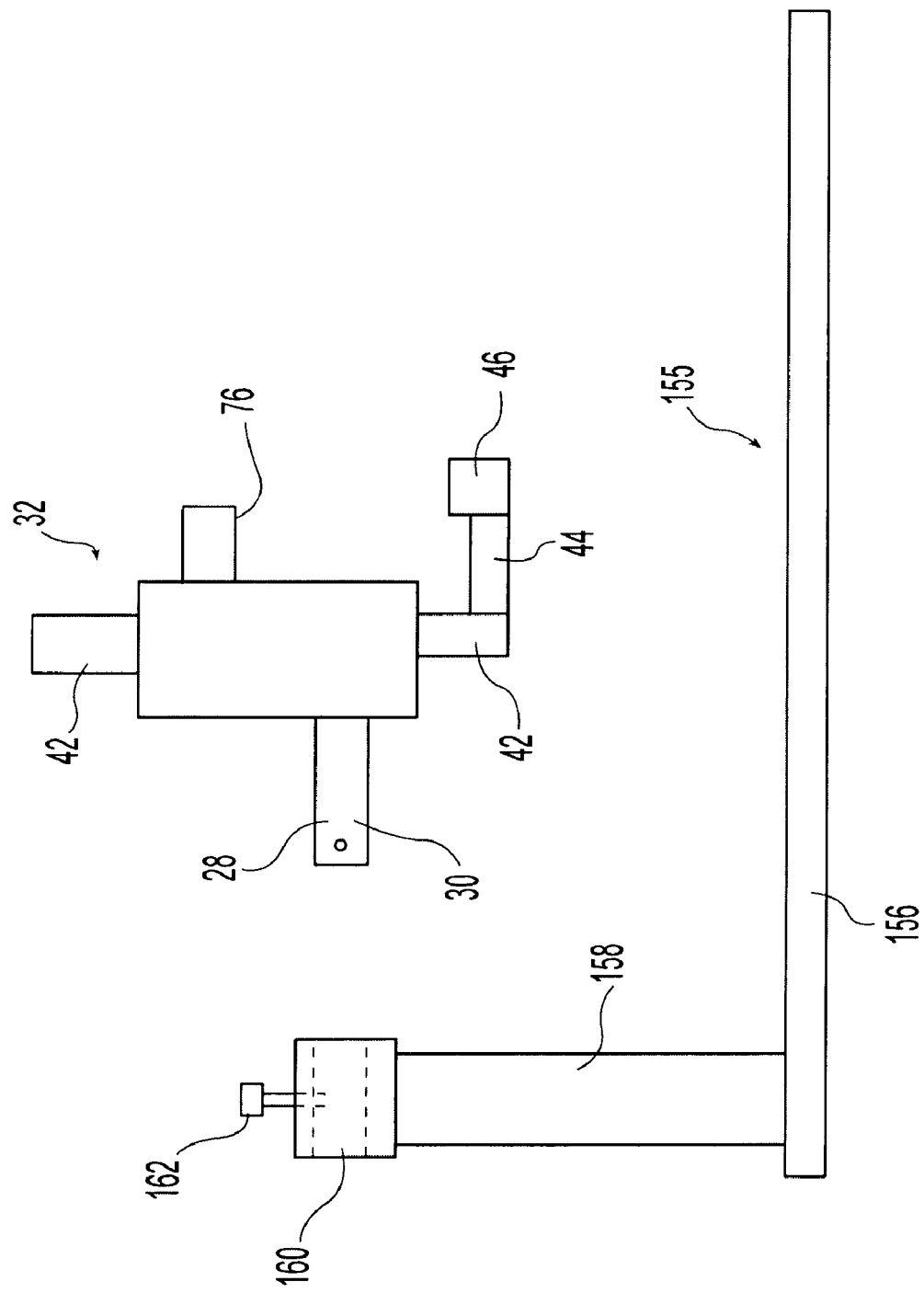
FIG. 19 is an exploded side view of a stationary stand and a mounting section of the apparatus.

FIG. 19 illustrates the use of a stationary stand 155 with drive head unit 32. Stand 155 includes a base member 155, e.g., a heavy metal plate, which provides stability to stand 155. A riser 158 extends upwardly from base 155 and has a receiver tube 160 mounted thereon. Both riser 158 and receiver tube 160 may be formed out of tubular steel members. Receiver tube 160 is the same size as a hitch receiver tube so that mounting stem 28 can be mounted therein. A bolt 162 secures mounting stem 28 in place. Alternatively, receiver tube 160 could have a greater length and be provided with an opening so that a locking pin could be inserted through both tube 160 and aperture 30 in stem 28 to secure drive head unit 32 in place. The use of a stand 155 not only provides for the convenient storage of drive unit 32 when it is not in use, but is also provides a lift unit that can be used in a garage or other suitable work environment without requiring drive head unit 32 to be attached to a vehicle. For example, a platform 80 or modified lift platform could be attached to unit 32 and be used to lift small vehicles, such as all-terrain vehicles, in a garage to facilitate the repair and maintenance of the all-terrain vehicles. The inclusion of a battery 40 in drive head unit 32, allowing unit 32 to be operational without hooking it up to a separate source of power, e.g., a vehicle 22, is of considerable benefit when using drive head unit 32 with a stationary stand 155.

Figure 20:
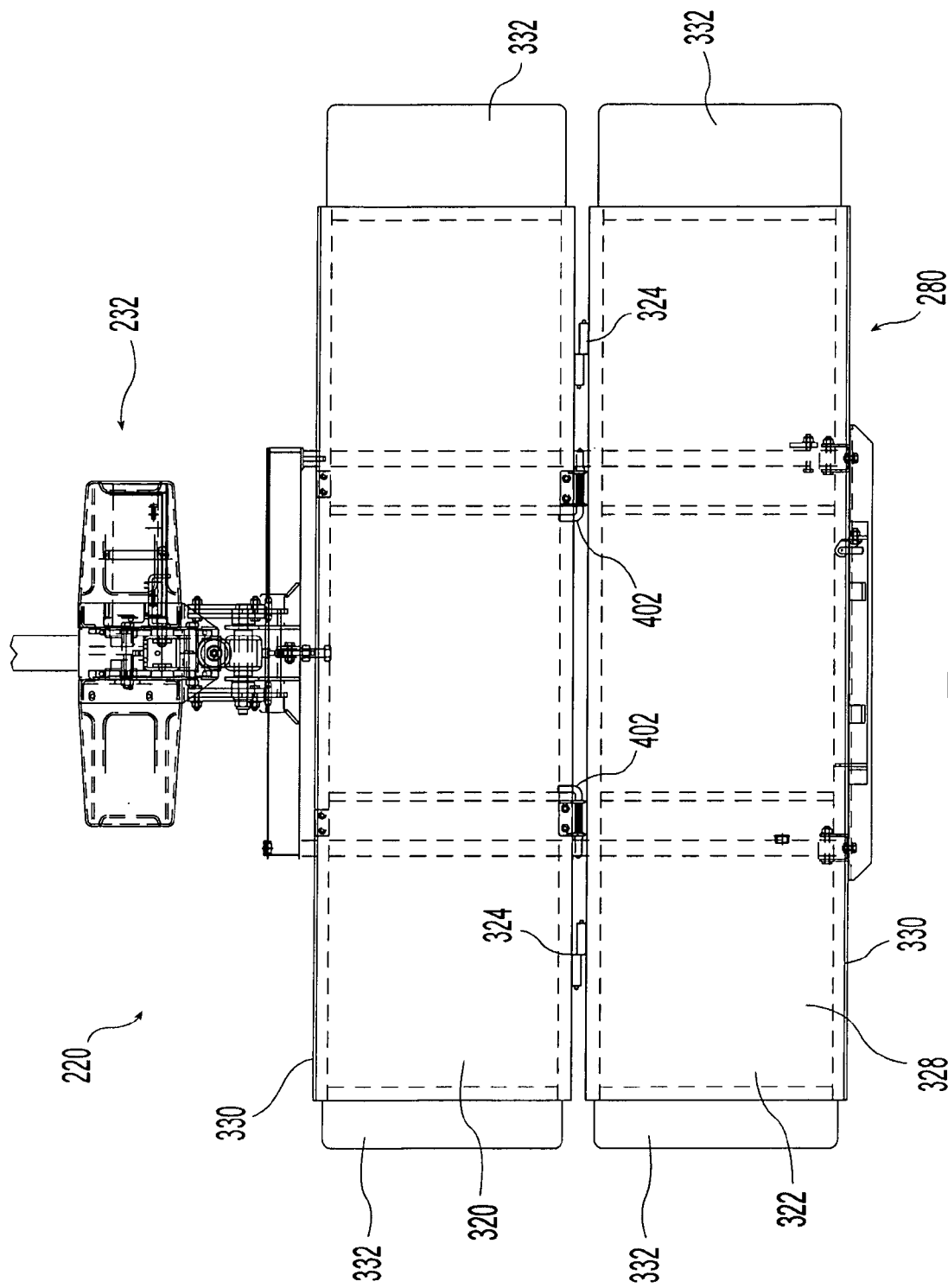
FIG. 20 is a top view of another embodiment of a lift apparatus.
Figure 21:
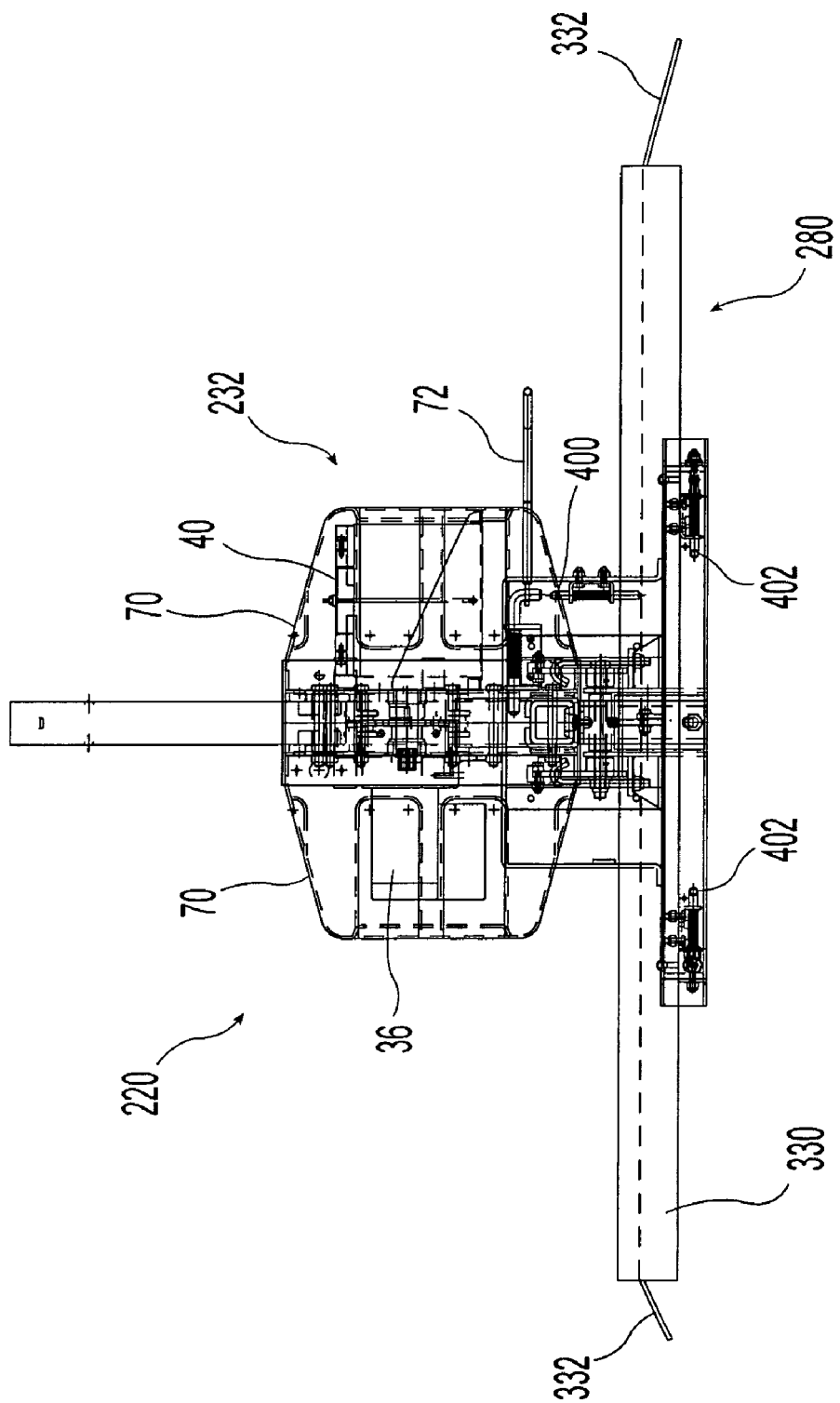
FIG. 21 is a rear view of the second embodiment.

A second embodiment is depicted in FIGS. 20-30. As can be seen in FIGS. 20 and 21, apparatus 220 includes a drive unit 232 and a platform assembly 280. The platform assembly 280 includes a framework 282 and a bifold surface assembly 328. Bifold surface assembly 328 is generally similar to assembly 128 but includes ramp sections 332 on each end of the assembly 328 with sidewalls 330 extending along the longitudinal lengthwise edges of the two separate halves of the assembly 328. Bifold assembly 328 is attached to framework 282 using spring-biased locking pins 402 (FIG. 29) instead of mounting pins and kotter pins. Like assembly 118, bifold assembly 328 includes two surface members 320, 322 which fold about hinges 324 so that bifold assembly 328 can be folded about hinges 324 from its use configuration shown in FIG. 20 (wherein surface members 320, 322 are disposed side-by-side in a common plane) to a compact configuration wherein surface members 320, 322 would be positioned in parallel planes and proximate each other.

Drive unit 232 is best seen in FIGS. 23-27. The sectional view illustrated in FIG. 26 is taken along line A-A of FIG. 25. Drive unit 232 is similar to drive unit 32 but uses a different method of securing the upper end of drive chain 248 to elongate member 242. (It is noted that chain 248 not all of the individual links forming chain 248 are shown in the Figures.) It is further noted that features identified in FIGS. 20-30 using reference numbers discussed above with reference to embodiment of FIGS. 1-14 are similar to those features discussed above with reference to FIGS. 1-14.

In the embodiment of FIGS. 20-30, elongate member 242 has had a portion 242a bent inwardly to provide a mounting location for the upper end of chain 248. Another inwardly bent portion 242b of member 242 provides a surface along which chain 248 extends. Chain 248 is attached to a rigid member 242c extending through an opening in the inwardly bent tab 242a and a spring 242d is positioned between a nut 242e and the tab 242a to remove slack from chain 248 as best seen in FIG. 25.

Similar to drive unit 32, a mounting stem 228 on mounting section 226 is used to secure drive unit 232 to a receiver hitch mounted on a vehicle 22 and an upwardly opening socket 246 is provided on lift section 234 for securing a platform assembly 280 on drive unit 232. A flat metal plate 246a is welded within socket 246 to act as a support stop near the bottom of socket 246. A polymeric stop member 496a is attached to the upper end of mounting member 496. Stop member 496a engages restraining member 276 to thereby retain platform assembly 280 in socket 246 when lift section 234 is raised.

As best seen in FIGS. 25 and 26, drive head assembly 232 has a drive gear 438 that is mounted on a support structure with bearings 38a similar to drive head assembly 32. Drive gear 438 is rotationally coupled with the shaft of motor 36 with spline member 438a. FIGS. 25 and 26 also illustrate idlers 461 which keep chain 248 engaged with drive gear 438. Drive assembly 32 includes similar idlers.

Figure 30:
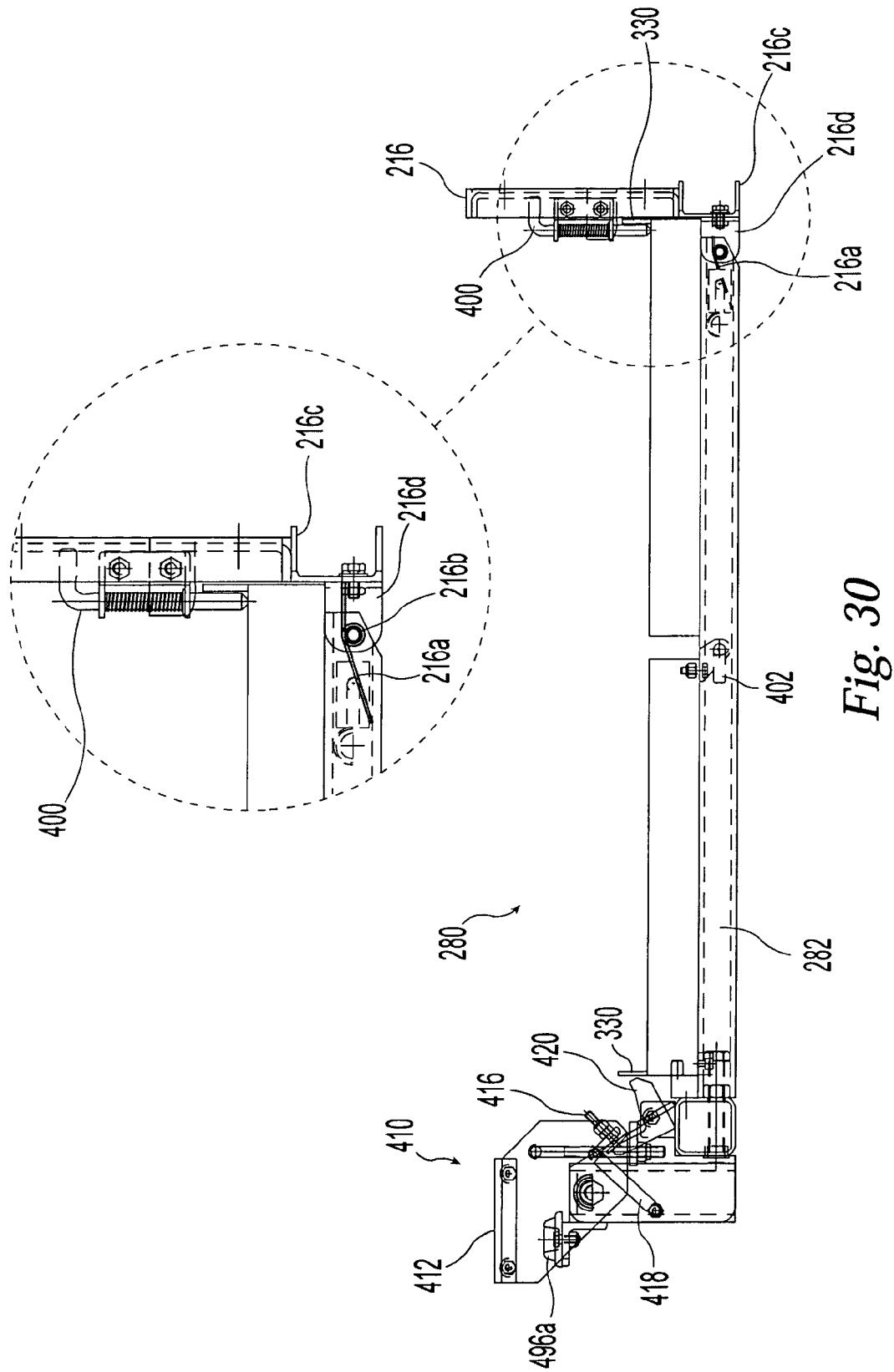
FIG. 30 is side view of the second platform assembly with a detail view.

As best seen in FIG. 30, platform assembly 280 includes a pivoting license plate holder 216 (and which may be coupled with taillights) that uses spring loaded locking pins 400 that engage sidewalls 330 to retain the license plate holder 216 in a desired position. License plate holder 216 is mounted on a C-channel 216c which in turn is mounted on brackets 216d pivotally mounted about bolts 216b. Bolts 216b thereby mount brackets 216d on support members 288 or plugs disposed within support members 288. Torsional springs 216a operably coupled with bolts 216b and support members 288 bias the license plate holder towards the proper position for the plate holder when platform assembly 280 is in a substantially vertical position.

A biasing assembly 410 is used to bias platform assembly 280 into a substantially vertical position when assembly 280 is raised and is not loaded with any objects. As best seen in FIGS. 22 and 28-30, assembly 410 includes two engagement members 412 which when in the position shown in full lines in FIG. 22 do not engage drive head unit 232 and allow platform assembly 280 to be raised in a substantially horizontal orientation. See also position 414 in the detail view. When assembly 280 is lowered and engagement members 412 are biased into the position indicated by dashed lines 414a and assembly 280 is then raised, engagement members 412 will bear against the steel support structure of drive head 232 and cause engagement members 412 to pivot into the position shown as 414b in the detail view of FIG. 22 and then engagement along an exterior surface of the support structure 233 of drive unit 232. When members 412 are biased into position 414*b* they will engage J-shaped members 415 mounted on framework 282 and thereby cause framework 282 to pivot about bolt 298 into a substantially vertical orientation. The downward depression of pivot bracket 420 which is coupled to actuator rod 416 causes engagement members 412 to be biased into position 414*a*. A spring 418 biases actuator 416 toward a position where engagement members 412 will not engage drive head unit 232 and assembly 280 will be raised in a substantially horizontal orientation. Pivot bracket 420 thereby provides a linkage that controls the position of engagement members 412 in response to the presence or absence of an object on platform assembly 280 and the configuration of that object.

When bifold assembly 328 is folded together and retained on framework 282 adjacent drive head unit 232, sidewall 330 which had been used to retain locking pins 400 of the license plate holder with be positioned so that it engages and depresses pivot bracket 420 and thereby positions engagement members 412 to bias platform assembly 280 into a substantially vertical position when lift section 234 is raised.

Figure 22:
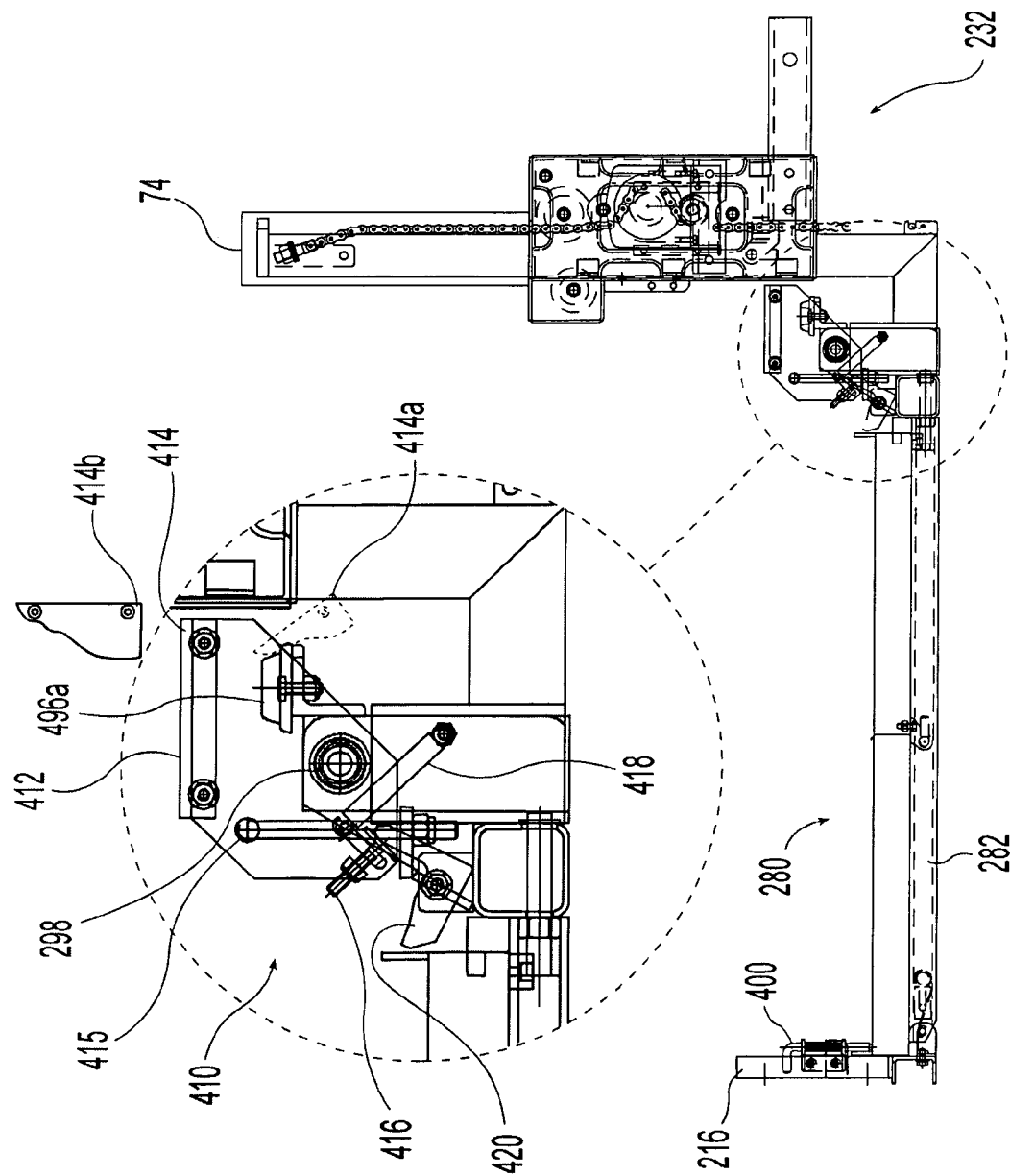
FIG. 22 is a side view of the apparatus with a detail view.
Figure 22A:
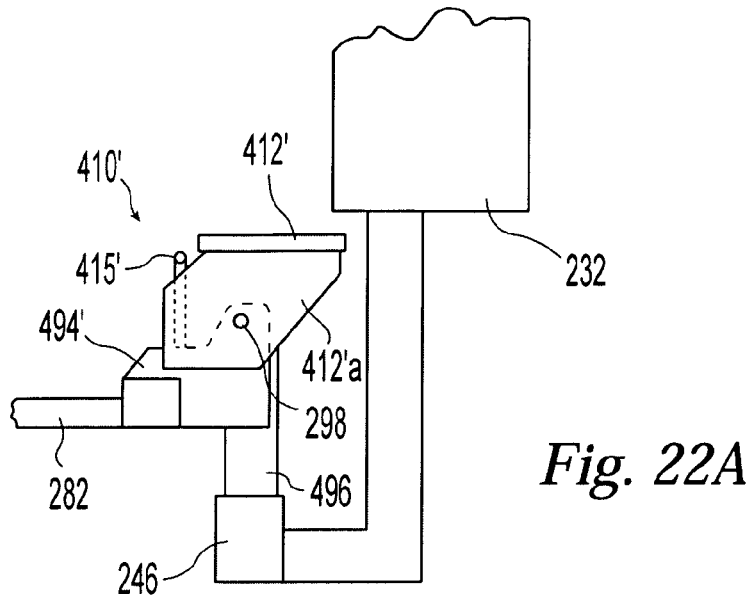
FIG. 22A is a schematic side view of the apparatus in a lowered position.
Figure 22B:
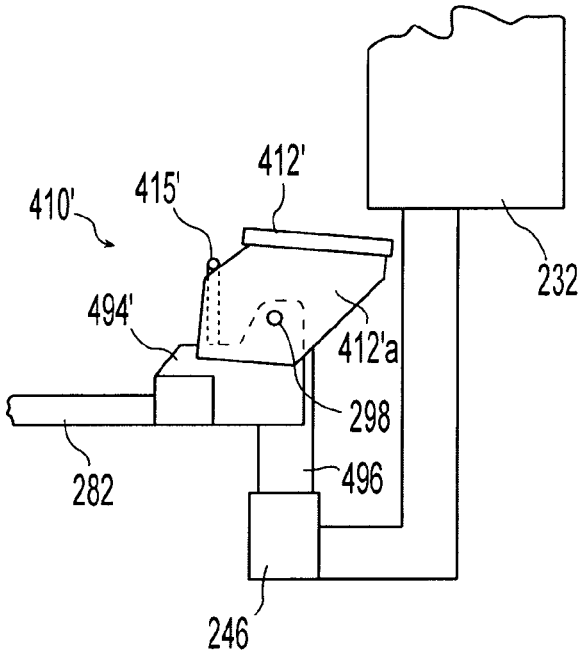
FIG. 22B is another schematic side view of the apparatus in a lowered position.
Figure 22C:
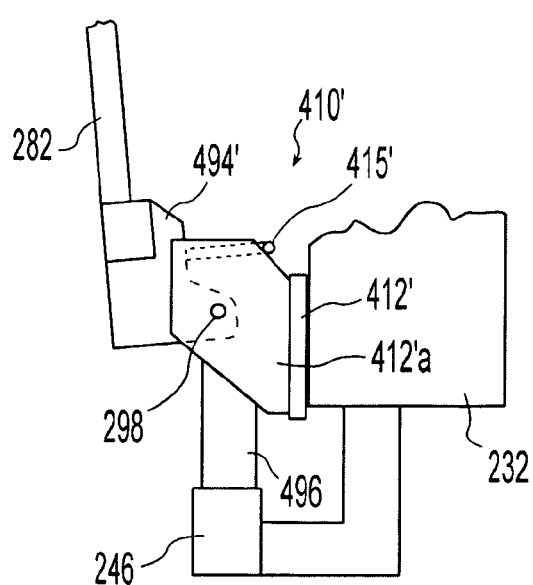
FIG. 22C is a schematic side view of the apparatus in a partially elevated position.
Figure 23:
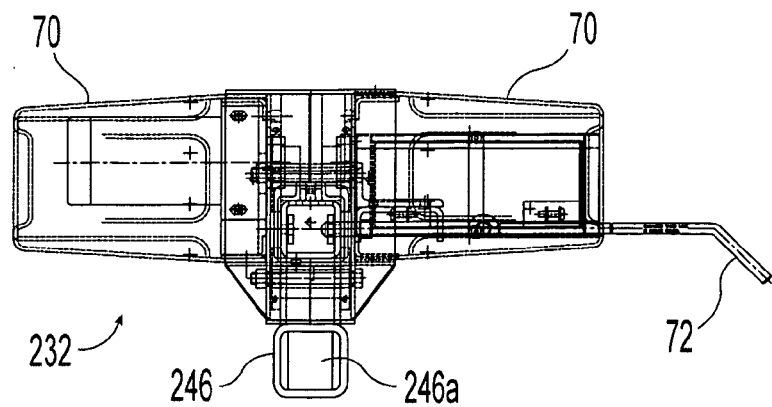
FIG. 23 is a top view of the drive unit of the second embodiment.
Figure 24:
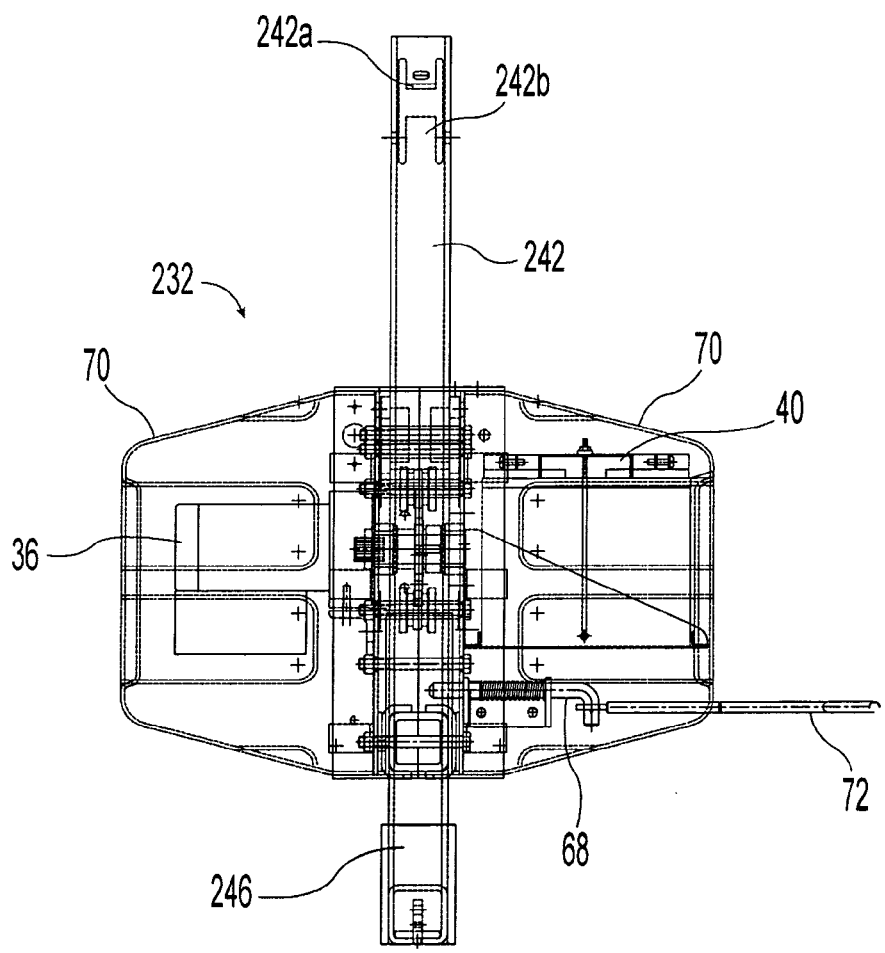
FIG. 24 is a rear view of the drive unit of the second embodiment.
Figure 29:
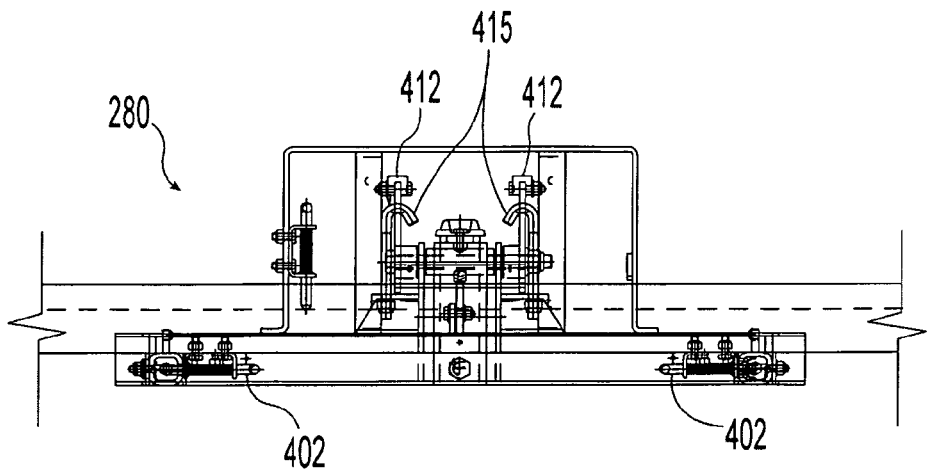
FIG. 29 is a rear view of a portion of the second platform assembly.
Figure 28:
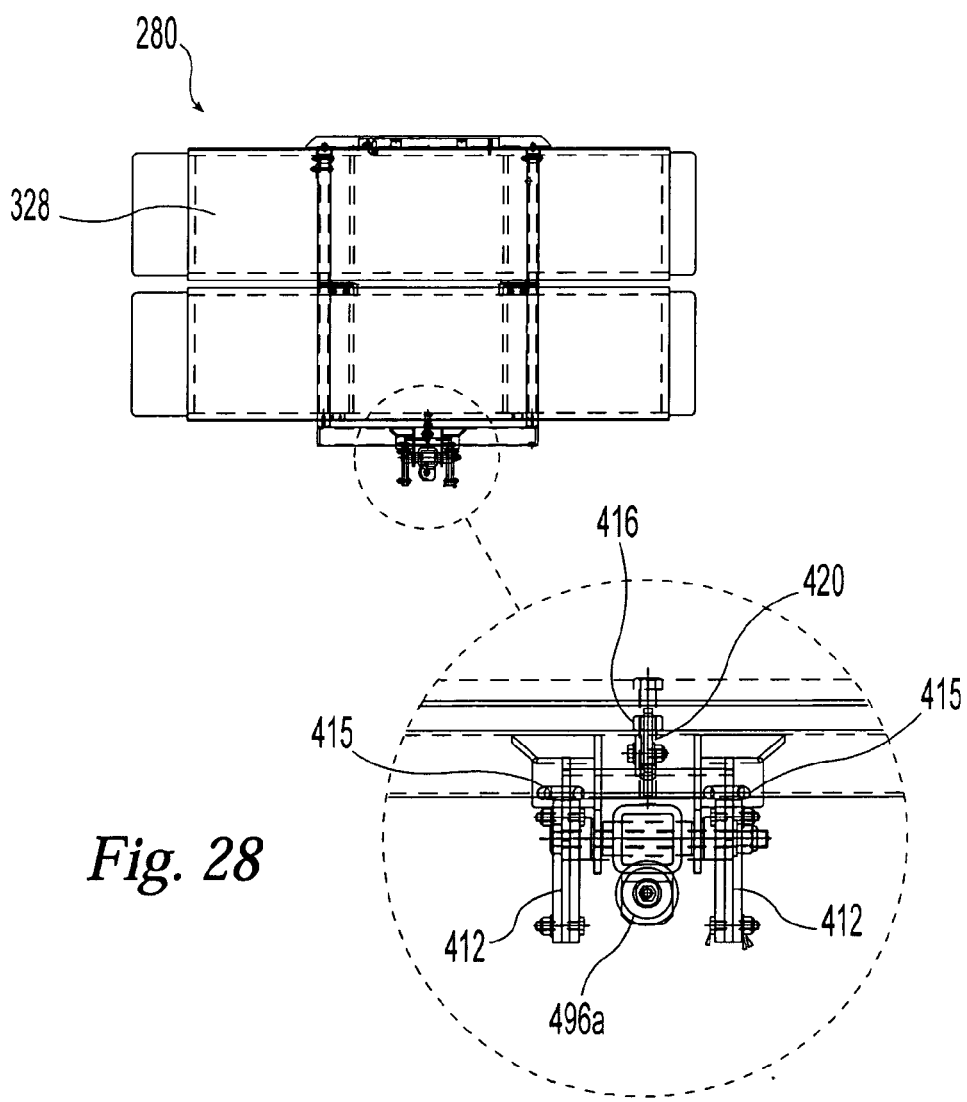
FIG. 28 is a top view of the second platform assembly with a detail view.

FIGS. 22A through 22C schematically depict the operation of a slightly modified biasing assembly 410' which functions in a generally similar manner to assembly 410. Engagement members 412' include brackets 412'*a* formed out of a metal plate and which has an upper edge engageable with a projecting arm of J-shaped members 415'. The lower end of members 415' is fixed to support brackets 494'. Pivot bolt 298 pivotally connects metal plates 412'*a* to mounting member 496 which is insertable into socket 246. Support brackets 494' are also pivotally connected to mounting member 496 by pivot bolt 298. Support brackets 494' thereby pivotally support platform framework 282 on mounting member 496. Support brackets 494' and engagement brackets 412' are independently pivotal about bolt 298 relative to mounting member 496. In other words, engagement brackets 412' can pivot relative to support brackets 494' and platform framework 282. A linkage assembly (not shown) such as pivot bracket 210 an actuating rod 418 is used to pivot engagement members 412' from the position shown in FIG. 22A into the position shown in FIG. 22B when bi-fold ramp assembly 328 is secured to the platform assembly in a compact configuration.

In FIG. 22A, modified biasing assembly 410' is positioned such that engagement members 412' will not engage drive head unit 232 as platform assembly 280 is raised. In both FIGS. 22A and 22B, the lift section of drive head unit 232 is in its lowered position. J-shaped members 415' have their bottom end secured to support brackets 494' and their upper J-shaped end positioned to abut engagement brackets 412'*a* upon relative rotation of engagement brackets 412'*a* and support bracket 494'. J-shaped members 415' thereby limit the amount of relative rotation between brackets 412'*a* and 494' which is caused by the linkage assembly. By pivoting engagement brackets 412'*a* into the position shown in FIG. 22B, brackets 412'*a* will engage J-shaped members 415' and position engagement members 412' to engage drive head unit 232 when the lift section and platform assembly 280 are raised toward their elevated position.

As the lift section is raised and engagement members contact drive head unit 232, engagement brackets will be pivoted about bolt 298 as engagement members 412' pivot into the engaged position shown in FIG. 22C. As engagement brackets 412'*a* pivot about bolt 298, the engagement brackets 412'*a* will cause J-shaped members 415' (and the entire platform framework 282 which fixed to members 415' through brackets 494') to pivot about bolt 298 with engagement brackets 412'*a*. Thus, when engagement members 412' are slidingly engaged with the drive head unit 232 (which is part of the mounting section secured to vehicle 22 in the illustrated example) as shown in FIG. 22C, platform assembly 280 will be disposed in a substantially vertical orientation.

When bifold assembly 328 is secured to platform assembly 280 in its use configuration, i.e., with both surface members 320 and 322 positioned in a common plane and in a side-by-side arrangement as depicted in FIG. 20, the bifold assembly 328 will not engage the linkage assembly and biasing assembly 410' will remain in the configuration depicted in FIG. 22A and platform assembly 280 can be raised in a horizontal orientation without engagement members 412' contacting drive head unit 232. When bifold assembly 328 is secured to platform framework 282 in its compact folded configuration, however, a sidewall 330 of bifold assembly 328 will engage the linkage assembly thereby placing engagement brackets 412' into the position depicted in FIG. 22B. If drive head unit 232 is then activated to raise the lift section and platform assembly 280, engagement members 412 will contact drive head unit 232 as they are being raised and pivot platform assembly 280 into a substantially vertical orientation as schematically depicted in FIG. 22C.

This ability to pivot platform assembly 280 into a vertical orientation with a folded bifold assembly 328 attached thereto is particularly advantageous when parking vehicle 22 at a destination where a mobility scooter will be used. For example, when vehicle 22 arrives at the destination, e.g., in a parking lot at the destination, platform assembly 280 can be lowered and the mobility scooter loaded thereon can be unloaded. Then, the bifold assembly 280 can be folded over so to place biasing assembly 410' into the position depicted in FIG. 22B. The platform can then be raised to pivot platform assembly 280 into a substantially vertical position. This allows vehicle 22 to be parked in a conventional parking space unlike the situation where assembly 280 remains in a substantially horizontal position and vehicle 22 will not fit into a conventional parking space. When leaving, vehicle 22 is repositioned in the parking lot if necessary, e.g., at the location in the parking lot nearest the location actually visited, assembly 280 lowered, bifold assembly 328 repositioned into its use configuration as depicted in FIG. 20 and the mobility scooter reloaded for transport.

Another embodiment 520 of the present invention is illustrated in FIGS. 31-42. Apparatus 520 is very similar to the embodiment depicted in FIGS. 20-30. A similar bi-fold ramp 328 is used and the drive head unit 532 is similar to drive head unit 232. One minor difference between drive head units 232 and 532 is that drive head unit 532 has a flexible handle 572 secured to locking pin 68 instead of a rigid extension arm 72. Platform assembly 580 differs from assembly 280 by having a modified biasing assembly 600, support members 588 that are welded to transverse member 590 and a modified taillight assembly 650. It is further noted that features identified in FIGS. 31-42 using reference numbers discussed above with reference to an alternative embodiment are similar to those features discussed above with reference to such alternative embodiment.

Figure 31:
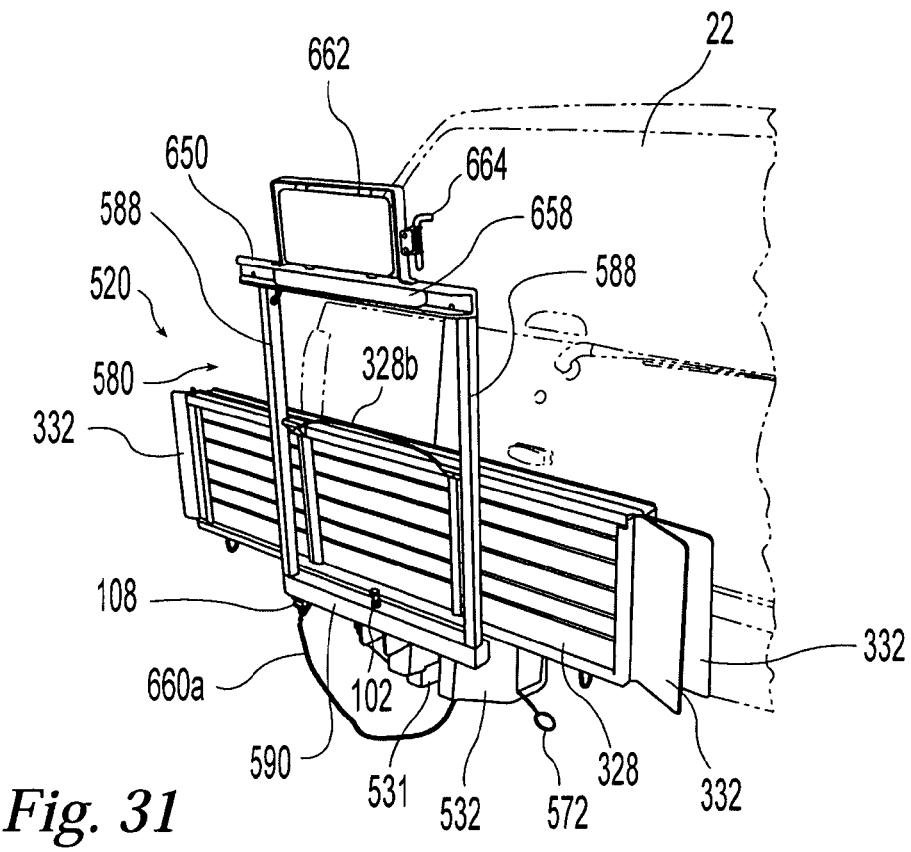
FIG. 31 is a perspective view of a third platform assembly.
Figure 32:
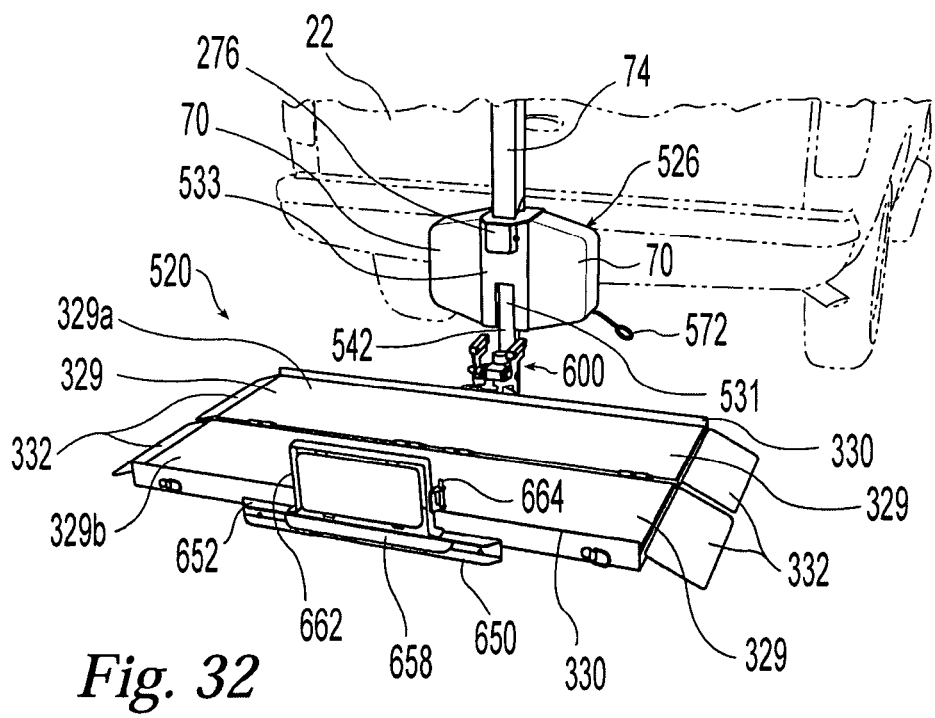
FIG. 32 is another perspective view of the third platform assembly.
Figure 33:
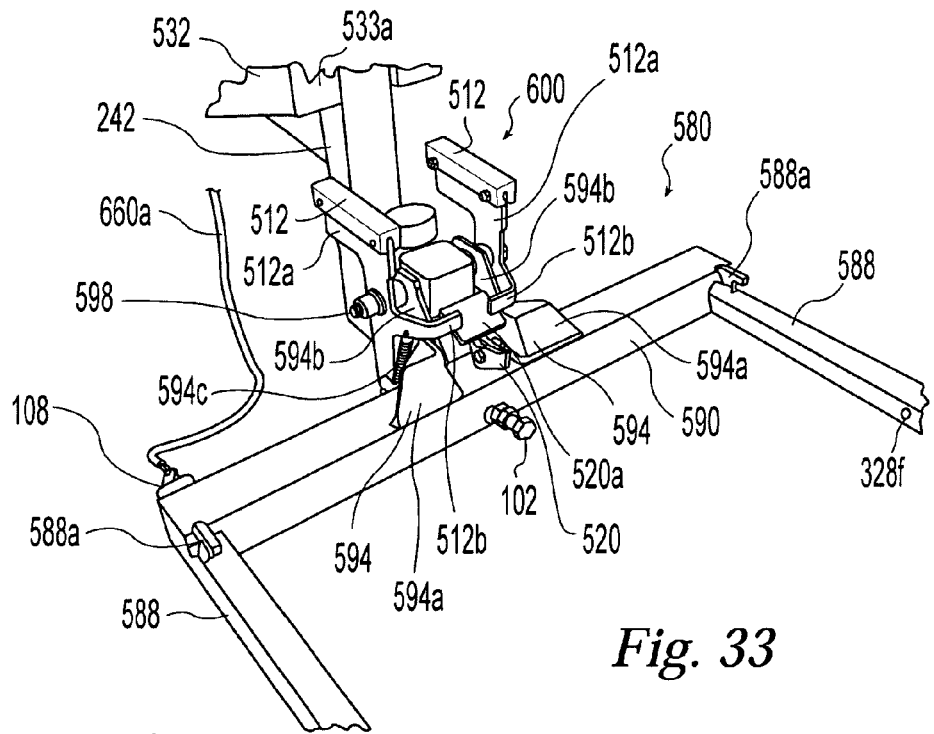
FIG. 33 is a perspective view of a portion of the third platform assembly.

FIG. 31 illustrates a bi-fold ramp 328 secured to platform assembly 580 in a compact configuration. The elongate member 542, socket 246 and remainder of the lift section of drive head unit 532 has been raised to its elevated position in FIG. 31 with platform assembly 580 being positioned in a substantially vertical orientation. FIG. 32 illustrates the apparatus 520 in a lowered position with platform assembly 580 in a substantially horizontal orientation and bi-fold ramp 328 in a use configuration.

Bi-fold ramp 328 is also shown in a use configuration in FIG. 40 and in a folded, compact configuration in FIG. 41.

Ramp 328 includes two surface panels 329a and 329b each of which have a substantially planar surface 329 for supporting a mobility scooter or similar device. Hinges 324 pivotally secure surface panels 329a and 329b together. In the use configuration depicted in FIGS. 32 and 40, surfaces 329 are positioned in a substantially co-planar orientation. In the compact configuration depicted in FIGS. 31 and 41, surfaces 329 are positioned proximate one another and in planes oriented substantially co-planar with each other.

Each of the surface panels 329a, 329b include a sidewall member which is positioned on the outside elongate edge of the panels 329a, 329b when the panels 329a, 329b are in the use configuration. Ramps 332 are positioned on the short edges of the panels 329a, 329b. Surface panel 329a is adapted for positioning next to transverse frame member 590 when ramp 328 is secured to support arms 588 by including openings 331 in sidewall 330. Openings 331 receive projections 588a when mounting ramp 328 on support arms 588.

Surface panel 329a also includes a pair of locking pins 328a. Locking pins 328a are inserted into openings 328f (FIG. 33) in support arms 588 when securing ramp 328 to support arms 588. As best seen in FIG. 42, each of the locking pins 328a is mounted in a C-shaped bracket 328c which is secured to panel member 329a. Helical spring 328d bears against an annular flange 328e on pin 328a to bias pin 328a into engagement with openings 328f. A flexible polymeric coated wire cable handle 328b is secured to one end of each of the pins 328a. Pulling on wire handle 328b simultaneously retracts both pins 328a to facilitate the convenient insertion and retraction of pins 328a from openings 328f. Pin 328a depicted in FIG. 42 is in a retracted position.

Taillight assembly 650 includes an elongate member 652 having a C-shaped profile that extends between opposing support arms 588. Two C-shaped pivot brackets 554 are attached to member 652 and are positioned to each receive an end of a support arm 588 between their sidewalls. A bolt 656 is used to pivotally secure brackets 554 (and thus taillight assembly 650) to support arms 588. Torsion springs 655 mounted about bolts 656 are operably engaged with support arms 588 and elongate member 652 to bias taillight assembly 650 into the position shown in FIG. 31 wherein taillights 658 and a license plate located within license plate holder 662 are properly positioned to be viewed by following traffic when platform assembly 580 is in a substantially vertical orientation. In FIG. 42A, elongate member 652 is illustrated approximately midway between its positions in FIGS. 31 and 32. A spring loaded locking pin 664 is secured to the side of license plate holder 662.

As can be seen in FIG. 32, when surface assembly 328 is mounted on platform assembly 580 in a use configuration, taillight assembly 650 can be manually pivoted and locking pin 664 used to latch behind sidewall 330 to retain taillight assembly 650 in a proper position to be viewed by following traffic with platform assembly 580 in a substantially horizontal orientation. Wiring 660 is routed from taillights 658 through one of the support arms 588 to a standard electrical connector 108 that is connected with wiring 660a from vehicle 22.

As best seen in FIG. 32, mounting section 526 includes a support structure 533 that defines a gap or channel 531. Support structure 533 has an outer surface 533a (FIG. 33) that extends on both sides of gap 531 and upwardly to restraining member 276. Surface 533a is defined by a metallic sheet or plate or other suitable material. Horizontal section 243 connects elongate member 242 with socket 246 and gap 531 allows for the passage of horizontal section 243 during the raising and lowering of elongate member 242.

Turning now to FIGS. 33-39, platform assembly 580 and biasing assembly 600 will be discussed. Platform assembly 580 includes a transverse member 590 and two support arms 588. In the illustrated embodiment, transverse member 590 and support arms 588 are each formed out of steel tubes and are welded together. Projections 588a are formed out of sheet steel and are welded to members 590 and 588. As mentioned above, projections 588a are used in the securing of items to platform support arms 588. Platform assembly 580 also includes a mounting member 596 that is received in socket 246 to mount platform assembly 580 on drive head unit 532. A stop member 596a is mounted on a bracket 596b that projects out from the upper end of mounting member 596. Stop member 596a engages retraining member 276 when platform assembly 580 is raised to an elevated position as schematically depicted in FIG. 39. Stop member 596a may be advantageously formed out of a polymeric material such as nylatron.

Support brackets 594 are formed out of steel plate material and two such brackets are welded to transverse member 590. Each of the support brackets 594 include a rearward sloping plate member 594a and a sidewall plate 594b. The rearward sloping member 594a and sidewall member 594b of each bracket 594 are welded to each other and to transverse member 590. Brackets 594 are positioned such that sidewall plates 594b are parallel with each other and disposed at a substantially perpendicular angle to transverse member 590. As can be seen in FIG. 35, mounting member 596 is disposed between sidewall plates 594b. Pivot bolt 598 extends through openings in sidewall plates 594b to thereby pivotally attach support brackets 594 and platform members 590, 588 to mounting member 596.

Engagement members 512 include a bracket member 512a formed out of a metal plate and a shoe 512d that is engageable with drive head unit 532. The illustrated engagement members 512 have shoes 512d that are formed out of nylatron, a low-friction polymeric material, and are attached to brackets 512a with a nut and bolt assembly. Other suitable materials, however, may also be employed to form engagement member shoes 512d. Engagement members 512 each include an inwardly extending arm 512b that is formed by bending the plate material of bracket 512a. A metal shoe or bearing member 512c is secured to each of the engagement members 512 at the end of brackets 512a which are opposite sliding shoe 512d. Bearing members 512c are positioned to bear against transverse member 590.

As can be seen in FIG. 35, engagement members 512 are positioned outwardly of sidewall plates 594b and pivot bolt 598 extends through openings in brackets 512a to thereby pivotally attached each of the engagement members 512 to mounting member 596. Hollow cylindrical spacers 598a are positioned on bolt 598 to space engagement members 512 outwardly from sidewall plates 594b. Engagement members 512 and support brackets 594 are independently rotatable about pivot bolt 598. In other words, engagement members 512 can rotate relative to support brackets 594 (and frame members 590, 588 attached thereto) about bolt 598. The amount of such relative rotation between engagement members 512 and support brackets 594, however, is limited. In one direction, the relative rotation of engagement members 512 is limited by the engagement of bearing members 512c with transverse member 590. Rotation of engagement members 512 in the opposite direction is limited due to the interaction of bracket arms 512b and a pivot bracket 502 located on transverse member 590. As discussed in greater detail below, bracket arms 512b and pivot bracket 520 are operably coupled linkage members which control the position of engagement members 512 in response to whether or not a bi-fold ramp 328 is mounted on support arms 588 in a compact configuration.

Figure 34:
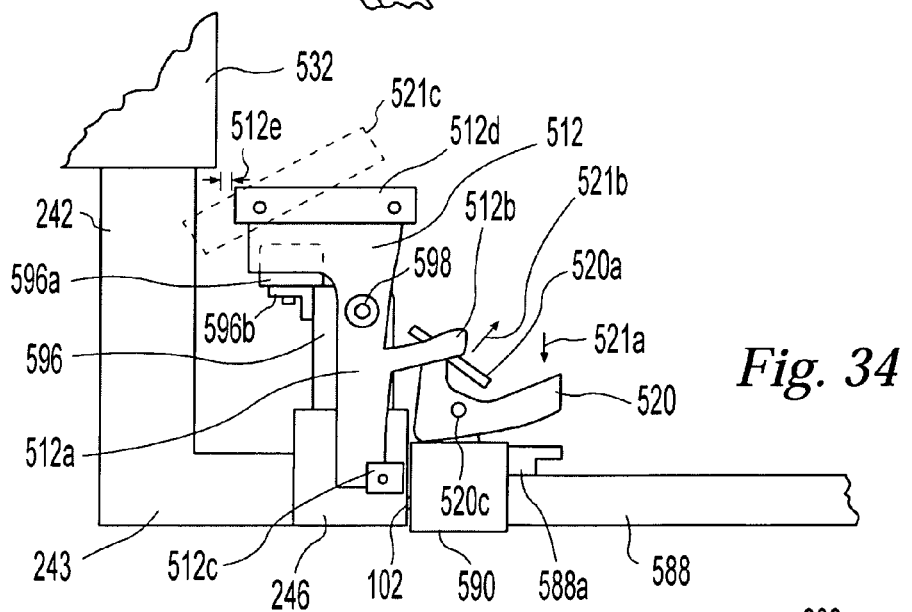
FIG. 34 is a schematic side view of a portion of the third platform assembly.
Figure 36:
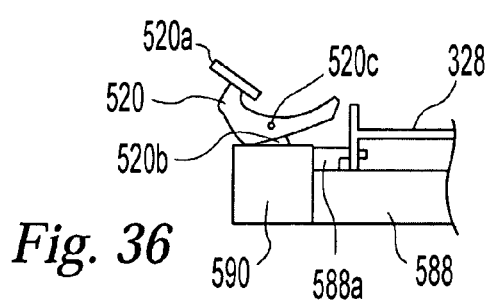
FIG. 36 is a schematic side view of a linkage member.

Pivot bracket 520 has a pivot plate 520a fixed thereto at one end that is engageable with bracket arms 512b. A metal plate is welded to transverse member 590 and forms a pivot support 520b. Pivot bracket 520 is pivotally mounted to pivot support 520b with a bolt that acts as a pivot pin 520c. Springs 594c (FIG. 33) are connected at one end to bracket arms 512b and are connected at the other end to sidewalls 594b. Springs 594c exert a biasing force on engagement members 512 that urges bearings members 512c away from transverse member 590. This biasing force also urges bracket arms 512b against pivot plate 520a. This biasing force exerted by bracket arms 512b urges the counterclockwise rotation of pivot bracket 520 when viewed in the direction depicted in FIGS. 34 and 36. Pivot bracket 520 is configured to contact transverse member 590 to limit the rotation of pivot bracket 520 in this direction. FIGS. 34 and 36 illustrate pivot bracket 520 in rotation limiting contact with transverse member 590.

When engagement members 512 are in the position shown in solid lines in FIG. 34, there is a clearance 512e between engagement members 512 and drive head unit 532 that allows platform assembly 580 to be raised without engagement members 512 contacting drive head unit 532 and with platform assembly 580 in a substantially horizontal orientation. If the end of pivot bracket 520 opposite pivot plate 520a is depressed as exemplified by arrow 521a, pivot plate 520a will be pivoted in the direction of arrow 521b thereby moving bracket arms 512b in this same direction and pivoting engagement members 512 into a position where bearing members 512c engage transverse member 590 and engagement shoes 512d are placed in the position represented by dashed outline 521c. When engagement shoes 512d are in the position represented by dashed outline 521c they will engage, pivot against and slide along support structure 533 of drive head unit 532 during the raising of platform assembly 580.

Figure 37:
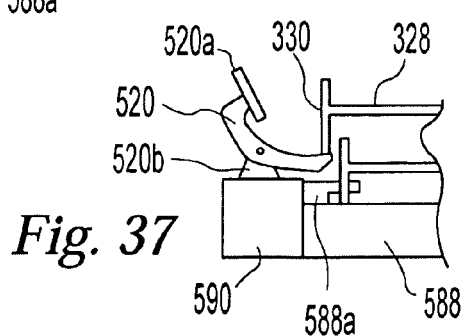
FIG. 37 is another schematic side view of a linkage member.

FIG. 37 illustrates how a sidewall 330 of bi-fold ramp 328 engages pivot bracket 520 and thereby biases pivot bracket in the direction indicated by arrow 521a when bi-fold ramp 328 is secured to support arms 588 in a compact configuration. FIGS. 38 and 39 schematically depict apparatus 520 and the operation of biasing assembly 600 as platform assembly 580 is raised and biasing assembly 600 causes platform assembly 580 to pivot into a substantially vertical orientation. In each of FIGS. 34, 38 and 39, support brackets 594 have been omitted for purposes of graphical clarity. Other simplifications have also been made in FIGS. 34, 38 and 39 for purposes of graphical clarity, e.g., drive chain 248 has not been depicted in these figures.

When the lift section of apparatus 520 (which includes elongate member 242, horizontal member 243 and socket 246) and platform assembly 580 mounted thereto are in a lowered position as depicted in FIG. 34, engagement arms 512 can be moved between a position where there is a clearance 512e between engagement members 512 and support structure 533 and platform assembly 580 can be raised in a horizontal orientation and to the position corresponding to dashed lines 521c where engagement members will contact support structure 533 when platform assembly 580 is raised.

FIG. 38 schematically represents the situation where engagement members 512 have just contacted support structure 533 after being urged into the position corresponding to dashed lines 521c and then raised from the lowered position. As platform assembly 580 is further raised from the point represented by FIG. 38, engagement members 512 will pivot about the lower edge of support structure 533 until shoes 512d are in slidable contact with exterior surface 533a of support structure 533. Bearing members 512c of engagement members 512 are in engagement with transverse member 580 as this pivoting motion of engagement members 512 takes places and thereby forces transverse member 590 and the remainder of platform assembly 580 to rotate along with engagement members 512 and thereby place platform assembly 580 into a substantially vertical orientation.

As elongate member 242 is further raised, engagement members 512 will slide along surface 533a until stop member 596a engages restraint member 276 as depicted in FIG. 39. FIG. 39 schematically depicts apparatus 520 with platform assembly 580 in an elevated position and in a substantially vertical orientation. When elongate member 242 is lowered, engagement members 512 and platform assembly 580 will move downwardly and platform assembly 580 will pivot into a substantially horizontal orientation once engagement members 512 have been lowered beyond the location depicted in FIG. 38.

Another embodiment of the present invention is illustrated in FIGS. 43-49 which includes a tool box structure 720. Features identified in FIGS. 43-49 using reference numbers discussed above with reference to an alternative embodiment are similar to those features discussed above with reference to such alternative embodiment. The embodiment of FIGS. 43-49 employs the same drive unit 532 as that discussed above and a platform structure 780 on which tool box structure 720 is securable. Tool box structure 720 includes an enclosure structure 722 that takes the form of a conventional tool box having a size suitable for holding the tools of a construction crew. Enclosure structure 722 includes a tool box body 724 with a cap 726 that pivots open. Locking handles 728 can lock cap 726 in its closed position. Exterior handles 730 on the opposite sides of enclosure 722 are used to lift tool box structure 722. Secured to conventional enclosure structure 722 is a supporting frame 732 that facilitates the movement of tool box structure 720 and adapts it for securement to platform structure 780. Frame 732 can be secured to enclosure structure 722 by bolting, welding or other suitable means.

Frame 732 includes a pair of wheels 734 which allow tool box structure to be tilted up and wheeled about a ground surface in the manner of a two-wheeled dolly. A foot stand 736 is positioned on frame 732 opposite wheels 734 so that tool box 720 can be set on the ground in a level orientation. Two L-shaped frame members 738, 740 extend along opposite lower edges of tool box enclosure 722. Front member 738 has an outerwardly projecting bracket 742 with an opening 744 located therein.

Tool box structure 720 can be mounted on platform assembly 780 when assembly 780 is in a substantially horizontal orientation as depicted in FIGS. 47 and 48. When tool box structure 720 is mounted on platform assembly 780, opening 744 receives locking pin 664 to secure taillight assembly 650 at a substantially perpendicular angle to platform assembly 780 as depicted in FIG. 47. Frame 732 also includes downwardly projecting cross members 746 that fit within support arms 788 to limit relative movement of tool box structure 720 on platform assembly 780. Rear frame member 740 has vertical wall spaced slightly outwardly from enclosure 722 and which includes openings 748. Openings 748 receive projections 788a on support arms 788 to secure tool box structure 720 on platform assembly 780 as best seen in FIG. 48. Projections 788a are formed by welding a shaped metal plate to support arms 788.

Platform assembly 780 is shown in FIG. 46 and includes a transverse member 790 from which two support arms 788 extend. Support members 790, 788 are all formed out of tubular steel members and are welded together in the illustrated embodiment. A pivotal taillight assembly 650 is attached to the distal ends of supports arms 788. The taillight assembly 650 attached to platform assembly 780 is the same as the taillight assembly attached to platform assembly 580 except that support arms 788 are not spaced as far apart as support arms 788.

Two support brackets 794 each having a rearward sloping plate 794a and a side plate 794b are welded together and to transverse member 790. Support brackets 794 pivotally support transverse member 790, support arms 788 and taillight assembly 650 on mounting member 796 through pivot bolt 798. A polymeric stop member 796a is mounted to the upper portion of mounting member 796 for contacting retaining member 276 when platform assembly 780 is mounted on drive head unit 532 and raised to an elevated position. Mounting member 796 is inserted into a socket 496 to mount platform assembly 780 on a drive head unit.

A steel tube 796b is welded to mounting member 796 and receives a kotter pin 798a to secure mounting member 796 and support brackets 794 in a desired rotational position. FIG. 48 illustrates platform assembly 780 in a position corresponding to a substantially horizontal configuration when mounting member 496 is inserted into a socket 496. When a kotter pin 798a is inserted into tube 796b in this position, pin 798a will prevent platform assembly from pivoting upward, engagement of bolt 102 with member 796 will limit pivoting movement in the opposite direction. Neither kotter pin 798a nor socket 496 are illustrated in FIG. 48. FIG. 49 illustrates the relative positions of brackets 794 and mounting member 496 that will place platform assembly 780 in a substantially vertical orientation when mounting member 796 is inserted into socket 496. To maintain platform assembly 780 in this orientation, kotter pin 798a is inserted through openings 794c in sidewalls 794b and tube 796b as depicted in FIG. 49.

The illustrated platform assembly 780 does not include any biasing mechanism or lift spring and platform assembly 780 must be manually positioned in the desired orientation when installing kotter pin 798a to maintain platform assembly 780 in the desired orientation.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus mountable on a vehicle having a hitch socket, said apparatus comprising:
   a mounting section, said mounting section being removeably engageable with the hitch socket of the vehicle;
   a lift section, said lift section being moveably coupled to said mounting section and wherein a socket is disposed on said lift section;
   a drive chain having a plurality of articulating links and defining a first end and an opposite second end;
   a drive gear operably engaged with said drive chain;
   wherein at least one of said drive gear, said first end and said second end is coupled to said mounting section and at least another one of said drive gear, said first end and said second end is coupled to said lift section; the rotation of said drive gear movingly driving said chain and thereby moving said lift section relative to said mounting section; and
   a lift platform removeably attachable to said lift section, said lift platform having a transverse frame member and a mounting member pivotally coupled with said transverse frame member proximate a midpoint of said transverse frame member and wherein said lift platform and said lift section are attachable by slidingly inserting said mounting member in said socket on said lift section and are detachable by slidingly disengaging said mounting member from said socket; and
   wherein said lift platform includes a platform surface assembly removably attachable to said lift platform with non-threaded pins, said surface assembly being defined by first and second surface members having substantially similar surface areas, said surface assembly further including at least one hinge pivotally connecting said first and second surface members wherein said first and second surface members are pivotal between a use configuration wherein the first and second surface members are positioned in a common plane and a compact configuration wherein said first and second surface members are positioned in a folded arrangement.

2. The apparatus of claim 1 wherein said first and second ends of said chain are both coupled to one of said mounting section and said lift section, said drive gear being mounted on the other one of said mounting section and said lift section.

3. The apparatus of claim 2 further comprising a rigid elongate structural member, said first and second ends of said chain each being coupled to said elongate structural member at spaced apart locations.

4. The apparatus of claim 3 wherein said elongate structural member defines a portion of said lift section and said drive gear is supported on said mounting section.

5. The apparatus of claim 1 wherein said lift section includes an upwardly opening socket and said lift platform includes a mounting member removeably insertable into said socket.

6. The apparatus of claim 1 wherein said lift platform is pivotable about an axis between a substantially horizontal position and a substantially vertical position relative to a non-tilting portion of said apparatus and wherein said apparatus further includes a threaded adjustment member threadingly engageable with one of said lift platform and said non-tilting portion of said apparatus and abuttingly engageable with the other of said lift platform and said non-tilting portion of said apparatus wherein selective positioning of said threaded adjustment member selectively adjusts the angle of said platform about said pivot axis when said lift platform is positioned in said substantially horizontal position.

7. The apparatus of claim 1 wherein said lift platform is pivotable between a substantially horizontal position and a substantially vertical position and wherein said apparatus further includes a biasing member operably coupled with said lift platform and biasing said lift platform towards said substantially vertical position, the biasing force exerted by said biasing member being insufficient to move said lift platform into said substantially vertical position when said lift platform is unburdened.

8. The apparatus of claim 1 wherein said lift platform is pivotable between a substantially horizontal position and a substantially vertical position, said lift platform including at least one pivotable tail light wherein said tail light is pivotable through an arc of approximately 90 degrees and thereby positionable in a rearward facing orientation when said lift platform is in a substantially horizontal position and when said lift platform is in a substantially vertical position.

9. The apparatus of claim 1 further comprising an electrical motor drivingly coupled with said drive gear and a wireless transmitter, said electrical motor being selectively operable by said wireless transmitter.

10. The apparatus of claim 9 wherein said lift section is moveable between a lowered position and an elevated position and wherein said apparatus further includes a biased locking member, said locking member being biased into a locking position securely interlocking said lift section and said mounting section when said lift section is moved into said elevated position and wherein movement of said lift section from said elevated position to said lowered position requires manual disengagement of said locking member from said locking position.

11. An apparatus mountable on a vehicle having a hitch socket, said apparatus comprising:
   mounting section engageable with the hitch socket;
   a motor drivingly coupled with a gear, said motor and said gear supported on said mounting section;
   a lift section including a rigid elongate structural member and an upwardly opening socket;
   a drive chain having a plurality of articulating links and defining a first end and an opposite second end, said first and second ends being secured to said rigid elongate structural member at spaced apart locations, said gear being operably engaged with said chain at a position intermediate said spaced apart locations wherein rotation of said gear raises and lowers said rigid elongate structural member relative to said mounting section; and
   at least one lift platform, said lift platform including a mounting member removeably insertable into said socket, said mounting member being pivotally secured to said lift platform whereby said lift platform is pivotal relative to said mounting section when said mounting member is inserted within said socket;
   a stop member secured to said mounting member and extending outwardly therefrom, said stop member extending toward said rigid elongate structural member when said mounting member is positioned in said socket; and
   a restraining member disposed on said mounting section and positioned to allow removal of said mounting member from said socket when said lift section is in said lowered position and engage said stop member and thereby prevent removal of said mounting member from said socket when said lift section is in said elevated position.

12. The apparatus of claim 11 further comprising a biasing member operably coupled with said chain and wherein said biasing member minimizes slack in said chain.

13. The apparatus of claim 11 wherein said spaced apart locations at which said first and second ends of said chain are secured define a distance and said distance is greater than half the length of said chain.

14. The apparatus of claim 11 wherein said mounting member is pivotally secured to said lift platform whereby said lift platform is pivotal relative to said mounting section when said mounting member is inserted within said socket.

15. The apparatus of claim 11 further comprising a wireless transmitter, said motor being controllably operable by said wireless transmitter.

16. The apparatus of claim 15 wherein said lift section is moveable between a lowered position and an elevated position and wherein said apparatus further includes a biased locking member, said locking member being biased into a locking position securely interlocking said lift section and said mounting section when said lift section is moved into said elevated position and wherein movement of said lift section from said elevated position to said lowered position requires manual disengagement of said locking member from said locking position.

17. The apparatus of claim 11 further comprising a battery powering said motor, said battery being disposed on said mounting section.

18. An apparatus mountable on a vehicle; said apparatus comprising:
   a mounting section engageable with the vehicle;
   a lift platform operably coupled with said mounting section, said lift platform being vertically moveable relative to said mounting section and pivotal about an axis between a substantially horizontal orientation and a substantially vertically orientation;
   a taillight assembly disposed proximate a distal end of said lift platform, said taillight assembly being electrically connectable to the vehicle and selectively repositionable between a first position and a second position, said taillight assembly facing rearwardly when said lift platform is in said substantially horizontal position and said taillight assembly is in said first position and said taillight assembly facing rearwardly when said lift platform is in said substantially vertical position and said taillight assembly is in said second position; and
   a biasing member disposed to bias said taillight assembly toward said second position and a retention pin moveably mounted on said taillight assembly, said retention pin being selectively engageable with an object secured on said lift platform to thereby secure said taillight assembly in said first position.

19. The apparatus of claim 18 wherein said taillight assembly is pivotally mounted to said lift platform.

20. The apparatus of claim 19 wherein said taillight assembly further comprises a license plate holder, said license plate holder being pivotal with said taillight assembly.

21. An apparatus mountable on a vehicle; said apparatus comprising:
   a mounting section engageable with the vehicle;
   a lift platform operably coupled with said mounting section, said lift platform being vertically moveable relative to said mounting section between a lowered position and an elevated position, said lift platform including a platform structure;
   a platform surface assembly, said surface assembly being removeably securable on said platform structure, said surface assembly being defined by first and second surface members having substantially similar surface areas, said surface assembly further including at least one hinge pivotally connecting said first and second surface members wherein said first and second surface members are pivotal between a use configuration wherein said first and second surface members are positioned in a common plane and a compact configuration wherein said first and second surface members are positioned in a folded arrangement;
   a pair of locking pins disposed on said platform surface assembly and moveable between a first position and a second position, said locking pins being biased toward said first position, said pins being engageable with said platform structure to thereby secure said platform surface assembly on said platform structure when in said first position; and
   a handle member coupled to each of said locking pins, said handle member being operable to simultaneously retract each of said pair of pins into said second position and thereby allow removal of said platform surface assembly from said platform structure.

22. An apparatus mountable on a vehicle; said apparatus comprising:
   a mounting section engageable with the vehicle;

a lift platform operably coupled with said mounting section, said lift platform being vertically moveable relative to said mounting section between a lowered position and an elevated position, said lift platform including a platform structure;

a platform surface assembly, said surface assembly being removeably securable on said platform structure, said surface assembly being defined by first and second surface members having substantially similar surface areas, said surface assembly further including at least one hinge pivotally connecting said first and second surface members wherein said first and second surface members are pivotal between a use configuration wherein said first and second surface members are positioned in a common plane and a compact configuration wherein said first and second surface members are positioned in a folded arrangement;

wherein said platform surface assembly is removeably securable on said platform structure in both said use configuration and said compact configuration and said lift platform is pivotable relative to said mounting section between a substantially vertical orientation and a substantially horizontal orientation, and wherein said apparatus further comprises:

an engagement member operably coupled with said lift platform and engageable with said mounting section wherein said engagement of said mounting section with said engagement member during elevation of said lift platform rotates said engagement member relative to said mounting section; and a linkage member operably coupled with said engagement member and, when said lift platform is in said lowered position, said linkage member has a first position that positions said engagement member for engagement with said mounting section and couples said lift platform with said engagement member wherein raising of said lift platform with said linkage member in said first position rotates said lift platform into a substantially vertical orientation; said linkage member having a second position relative to said engagement member wherein raising of said lift platform with said linkage member in said second position raises said lift platform in a substantially horizontal orientation; said linkage member being operably engageable with said platform surface assembly wherein mounting said platform surface assembly on said platform structure in said compact configuration positions said linkage member in said first position and mounting said platform surface assembly on said platform structure in said use configuration positions said linkage member in said second position.

23. An apparatus mountable on a vehicle, said apparatus comprising:

a mounting section mountably engageable with the vehicle;

a lift section operably coupled with said mounting section and moveable between a lowered position and an elevated position;

a platform structure supported on said lift section and pivotal between a substantially horizontal orientation and a substantially vertical orientation;

an engagement bracket pivotal relative to said lift section, said engagement bracket having an engagement member engageable with said mounting section, said engagement bracket having a lifting configuration wherein movement of said lift section between said lowered and elevated positions raises said platform structure in a substantially horizontal orientation and a tilting configuration wherein raising said lift section from said lowered position to said elevated position with said engagement bracket in said tilting configuration rotates said engagement bracket through a pivot angle of at least about 90 degrees and operably couples said engagement bracket with said platform structure and thereby pivots said platform structure from said substantially horizontal orientation to said substantially vertical orientation;

a linkage member pivotally mounted on said platform structure and operably couplable with said engagement bracket, said linkage member being pivotal between a first position and a second position wherein disposing said linkage member in said first position positions said engagement bracket in said lifting configuration and disposing said linkage member in said second position positions said engagement bracket in said tilting configuration; and a biasing member operably engaged with said engagement bracket and biasing said engagement bracket toward said lifting configuration.

24. An apparatus mountable on a vehicle, said apparatus comprising:

a mounting section mountably engageable with the vehicle;

a lift section operably coupled with said mounting section and moveable between a lowered position and an elevated position;

a platform structure supported on said lift section and pivotal between a substantially horizontal orientation and a substantially vertical orientation;

an engagement bracket pivotal relative to said lift section, said engagement bracket having an engagement member engageable with said mounting section, said engagement bracket having a lifting configuration wherein movement of said lift section between said lowered and elevated positions raises said platform structure in a substantially horizontal orientation and a tilting configuration wherein raising said lift section from said lowered position to said elevated position with said engagement bracket in said tilting configuration rotates said engagement bracket through a pivot angle of at least about 90 degrees and operably couples said engagement bracket with said platform structure and thereby pivots said platform structure from said substantially horizontal orientation to said substantially vertical orientation;

a linkage member pivotally mounted on said platform structure and operably couplable with said engagement bracket, said linkage member being pivotal between a first position and a second position wherein disposing said linkage member in said first position positions said engagement bracket in said lifting configuration and disposing said linkage member in said second position positions said engagement bracket in said tilting configuration; and a mounting member pivotally secured to said platform structure, said mounting member being selectively mountable on said lift section whereby said platform structure is removeably mounted on said lift section, said engagement bracket being pivotally mounted on said mounting member.

25. The apparatus of claim 23 wherein, during elevation of said lift section, said engagement member is spaced from said mounting section when in said lifting configuration and engages said mounting section when in said tilting configuration.

26. The apparatus of claim 25 wherein said engagement member is slidingly engageable said mounting section.

27. The apparatus of claim 23 further comprising a platform surface assembly, said platform surface assembly having first and second surface members with substantially similar surface areas and at least one hinge pivotally connecting said first and second surface members wherein said first and second surface members are pivotal between a use configuration wherein said first and second surface members are positioned in a common plane and a compact configuration wherein said first and second surface members are positioned in a folded arrangement, said platform surface assembly being removeably securable to said platform structure in both said use configuration and said compact configuration, said platform surface assembly being operably engageable with said linkage member wherein mounting said platform surface assembly on said platform structure in said use configuration disposes said linkage member in said first position and mounting said platform surface assembly on said platform structure in said compact configuration disposes said linkage member in said second position.

28. The apparatus of claim 24 further comprising a biasing member operably engaged with said engagement bracket and biasing said engagement bracket toward said lifting configuration.

29. The apparatus of claim 24 wherein said platform structure and said engagement bracket are independently pivotal about a common pivot member.

\* \* \* \* \*